United States Patent
Nam et al.

(10) Patent No.: US 11,240,716 B2
(45) Date of Patent: Feb. 1, 2022

(54) SIMULTANEOUS CONTROL INFORMATION RECEPTION FROM SOURCE AND TARGET CELLS DURING HANDOVER

(71) Applicant: QUALCOMM Incorporated, San Diego, CA (US)

(72) Inventors: Wooseok Nam, San Diego, CA (US); Tao Luo, San Diego, CA (US); Olufunmilola Omolade Awoniyi-Oteri, San Diego, CA (US); Hung Dinh Ly, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/993,584

(22) Filed: Aug. 14, 2020

(65) Prior Publication Data

US 2021/0084549 A1 Mar. 18, 2021

Related U.S. Application Data

(60) Provisional application No. 62/900,406, filed on Sep. 13, 2019.

(51) Int. Cl.
*H04W 36/00* (2009.01)
*H04W 8/24* (2009.01)
(Continued)

(52) U.S. Cl.
CPC ......... *H04W 36/0069* (2018.08); *H04W 8/24* (2013.01); *H04W 24/08* (2013.01);
(Continued)

(58) Field of Classification Search
CPC ............. H04W 36/0069; H04W 36/18; H04W 36/0077; H04W 36/0079; H04W 8/24; H04W 24/08; H04W 36/0072
See application file for complete search history.

(56) References Cited

U.S. PATENT DOCUMENTS

2014/0036747 A1 2/2014 Nory et al.

FOREIGN PATENT DOCUMENTS

| EP | 3386237 A1 | 10/2018 | |
| WO | WO-2014146723 A1 | 9/2014 | |
| WO | WO-2018026401 A | * 2/2018 | ............ H04W 36/08 |

OTHER PUBLICATIONS

"RAN1 Chairman's Notes", 3GPP TSG RAN WG1 Meeting #97, Reno, USA, May 2019, (103 pages, in particular section 7.2.12). (Year: 2019).*

(Continued)

*Primary Examiner* — Nam T Huynh
(74) *Attorney, Agent, or Firm* — Holland & Hart LLP

(57) ABSTRACT

Methods, systems, and devices for wireless communications are described. A user equipment (UE) may transmit a UE capability message indicating support for a dual-base station control resource allocation scheme during a make-before-break (MBB) handover procedure, the dual-base station control resource allocation scheme comprises dividing a maximum number of UE supported control channel monitoring resources between a source base station and a target base station. The UE may identify, based at least in part on the dual-base station control resource allocation scheme, a first set of control channel monitoring resources for the source base station and a second set of control channel monitoring resources for the target base station. The UE may receive, during the MBB handover procedure, control information from the source base station during the first set of control channel monitoring resources and from the target base station during the second set of control channel monitoring resources.

30 Claims, 18 Drawing Sheets

(51) Int. Cl.
H04W 24/08 (2009.01)
H04W 36/18 (2009.01)
(52) U.S. Cl.
CPC ... *H04W 36/0072* (2013.01); *H04W 36/0077* (2013.01); *H04W 36/0079* (2018.08); *H04W 36/18* (2013.01)

(56) References Cited

OTHER PUBLICATIONS

International Search Report and Written Opinion—PCT/US2020/046691—ISA/EPO—dated Oct. 29, 2020.

* cited by examiner

SIMULTANEOUS CONTROL INFORMATION RECEPTION FROM SOURCE AND TARGET CELLS DURING HANDOVER

CROSS REFERENCE

The present application for patent claims the benefit of U.S. Provisional Patent Application No. 62/900,406 by NAM et al., entitled "SIMULTANEOUS CONTROL INFORMATION RECEPTION FROM SOURCE AND TARGET CELLS DURING HANDOVER," filed Sep. 13, 2019, assigned to the assignee hereof, and expressly incorporated by reference herein.

BACKGROUND

The following relates generally to wireless communications, and more specifically to simultaneous control information reception from source and target cells during handover.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support simultaneous control information reception from source and target cells during handover. Generally, aspects of the described techniques improve user equipment (UE) receipt of control information from both a source and target base station during a handover procedure, such as a make-before-break (MBB) handover procedure. For example, the UE may be connected to the source base station and implementing mobility management functions to ensure the UE maintains connectivity. This may result in a handover of the UE from the source base station to a target base station, e.g., due to UE mobility. In some examples, the handover procedure may be an MBB handover procedure where the UE is connected to both a source and target base station, at least to some degree, during the handover procedure. For example, the UE may transmit or otherwise provide a UE capability message to the source base station (e.g., during initial connection establishment) that carries or conveys an indication of support by the UE for a dual-base station resource allocations scheme during the MBB handover procedure. This may include an indication that the UE supports dividing the maximum number of control channel monitoring occasion supported by the UE between the source base station and the target base station. The division may be symmetrical or asymmetrical. Accordingly, the UE may identify (e.g., be configured with) a first set of control channel monitoring resources for the source base station and a second set of control channel monitoring resources for the target base station. Generally, the control channel monitoring resources in the first set and the second set may be limited such that the cumulative control channel monitoring resources do not exceed the maximum number of UE supported control channel monitoring resources. Accordingly, the UE may receive control information during the MBB handover procedure from the source base station during (or using) the first set of control channel monitoring resources and from the target base station during (or using) the second set of control channel monitoring resources. The dual-base station resource allocations scheme supported by, and configured for, the UE may enable UEs supporting a reduced number of control channel monitoring resources (e.g., low-tier UEs, wearable devices, etc.) during the MBB handover procedure.

A method of wireless communication at a UE is described. The method may include transmitting a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station, identifying, based on the dual-base station control resource allocation scheme, a first set of control channel monitoring resources for the source base station and a second set of control channel monitoring resources for the target base station, and receiving, during the MBB handover procedure, control information from the source base station during the first set of control channel monitoring resources and from the target base station during the second set of control channel monitoring resources.

An apparatus for wireless communication at a UE is described. The apparatus may include a processor, memory coupled with the processor, and instructions stored in the memory. The instructions may be executable by the processor to cause the apparatus to transmit a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station, identify, based on the dual-base station control resource allocation scheme, a first set of control channel monitoring resources for the source base station and a second set of control channel monitoring resources for the target base station, and receive, during the MBB handover procedure, control information from the source base station during the first set of control channel monitoring resources and from the target base station during the second set of control channel monitoring resources.

Another apparatus for wireless communication at a UE is described. The apparatus may include means for transmitting a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station, identifying, based on the dual-base station control resource allocation scheme, a first set of control channel monitoring resources for the source base station and a second set of control channel monitoring resources for the target base station, and receiving, during the MBB handover procedure, control information from the source base station during the first set of control channel monitoring resources and from the target base station during the second set of control channel monitoring resources.

A non-transitory computer-readable medium storing code for wireless communication at a UE is described. The code may include instructions executable by a processor to transmit a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station, identify, based on the dual-base station control resource allocation scheme, a first set of control channel monitoring resources for the source base station and a second set of control channel monitoring resources for the target base station, and receive, during the MBB handover procedure, control information from the source base station during the first set of control channel monitoring resources and from the target base station during the second set of control channel monitoring resources.

Some examples of the method, apparatuses, and non-transitory computer-readable medium described herein may further include operations, features, means, or instructions for generating the UE capability message to indicate support for at least one of a symmetric dual-base station control resource allocation scheme, or an asymmetric dual-base station control resource allocation scheme where, or a combination thereof.

In some examples of the method, apparatuses, and non-transitory computer-readable medium described herein, the first set of control channel monitoring resources include a balanced number of control channel monitoring resources as the second set of control channel monitoring resources in the symmetric dual-base station control resource allocation scheme, and the first set of control channel monitoring resources include an unbalanced number of control channel monitoring resources as the second set of control channel monitoring resources in the asymmetric dual-base station control resource allocation scheme.

Some examples of the method, apparatuses, and non-transitory computer-readable medium described herein may further include operations, features, means, or instructions for generating the UE capability message to include a first indication of support for a source base station resource allocation scheme and a second indication of support for a target base station resource allocation scheme, where the dual-base station control resource allocation scheme may be based on the first indication and the second indication.

Some examples of the method, apparatuses, and non-transitory computer-readable medium described herein may further include operations, features, means, or instructions for generating the UE capability message to include a single indication of support for the dual-base station control resource allocation scheme.

In some examples of the method, apparatuses, and non-transitory computer-readable medium described herein, the first set of control channel monitoring resources may be in a same frequency range as the second set of control channel monitoring resources.

Some examples of the method, apparatuses, and non-transitory computer-readable medium described herein may further include operations, features, means, or instructions for receiving the control information from the source base station during the first set of control channel monitoring resources using a first beamform configuration, and receiving the control information from the target base station during the second set of control channel monitoring resources using a second beamform configuration that may be different from the first beamform configuration.

In some examples of the method, apparatuses, and non-transitory computer-readable medium described herein, the first set of control channel monitoring resources may be in a different frequency range as the second set of control channel monitoring resources.

Some examples of the method, apparatuses, and non-transitory computer-readable medium described herein may further include operations, features, means, or instructions for receiving the control information from the source base station during the first set of control channel monitoring resources over a first frequency range, and receiving the control information from the target base station during the second set of control channel monitoring resources over a second frequency range that may be different from the first frequency range.

In some examples of the method, apparatuses, and non-transitory computer-readable medium described herein, the UE supported control channel monitoring resources include at least one of PDCCH candidates that the UE attempts blind decoding, a CCE candidate location of PDCCH that the UE performs channel estimation, or a combination thereof.

A method of wireless communication at a source base station is described. The method may include receiving a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station, selecting, based on the dual-base station control resource allocation scheme, a first set of control channel monitoring resources for the source base station and a second set of control channel monitoring resources for the target base station, and transmitting, during the MBB handover procedure, source base station control information from the source base station during the first set of control channel monitoring resources while the target base station transmits target base station control information during the second set of control channel monitoring resources.

An apparatus for wireless communication at a source base station is described. The apparatus may include a processor, memory coupled with the processor, and instructions stored in the memory. The instructions may be executable by the processor to cause the apparatus to receive a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station, select, based on the dual-base station control resource allocation scheme, a first set of control channel monitoring resources for the source base station and a second set of control channel monitoring resources for the target base station, and transmit, during the MBB handover procedure, source base station control information from the source base station during the first set of control channel monitoring resources while the target base station transmits target base station control information during the second set of control channel monitoring resources.

Another apparatus for wireless communication at a source base station is described. The apparatus may include means for receiving a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station, selecting, based on the dual-base station control resource allocation scheme, a first set of control channel monitoring resources for the source base station and a second set of control channel monitoring resources for the target base station, and transmitting, during the MBB handover procedure, source base station control information from the source base station during the first set of control channel monitoring resources while the target base station transmits target base station control information during the second set of control channel monitoring resources.

A non-transitory computer-readable medium storing code for wireless communication at a source base station is described. The code may include instructions executable by a processor to receive a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station, select, based on the dual-base station control resource allocation scheme, a first set of control channel monitoring resources for the source base station and a second set of control channel monitoring resources for the target base station, and transmit, during the MBB handover procedure, source base station control information from the source base station during the first set of control channel monitoring resources while the target base station transmits target base station control information during the second set of control channel monitoring resources.

Some examples of the method, apparatuses, and non-transitory computer-readable medium described herein may further include operations, features, means, or instructions for identifying at least one of a base station priority of the source base station and the target base station, or a numerology of the source base station and the target base station, or a number of component carriers associated with the source base station and the target base station, or a combination, where the selecting may be based on the identifying.

Some examples of the method, apparatuses, and non-transitory computer-readable medium described herein may further include operations, features, means, or instructions for providing, during the MBB handover procedure, an indication of the second set of control channel monitoring resources to the target base station.

Some examples of the method, apparatuses, and non-transitory computer-readable medium described herein may further include operations, features, means, or instructions for coordinating, during the MBB handover procedure, with the target base station to select the first set of control channel monitoring resources and the second set of control channel monitoring resources.

In some examples of the method, apparatuses, and non-transitory computer-readable medium described herein, the coordinating includes exchanging one or more messages via at least one of a backhaul network, or a core network function, or a central unit (CU) function associated with the source base station and target base station, or a combination thereof.

Some examples of the method, apparatuses, and non-transitory computer-readable medium described herein may further include operations, features, means, or instructions for determining, based on the UE capability message, that the UE supports at least one of a symmetric dual-base station control resource allocation scheme, or an asymmetric dual-base station control resource allocation scheme where, or a combination thereof.

In some examples of the method, apparatuses, and non-transitory computer-readable medium described herein, the first set of control channel monitoring resources include a balanced number of control channel monitoring resources as the second set of control channel monitoring resources in the symmetric dual-base station control resource allocation scheme, and the first set of control channel monitoring resources include an unbalanced number of control channel monitoring resources as the second set of control channel monitoring resources in the asymmetric dual-base station control resource allocation scheme.

In some examples of the method, apparatuses, and non-transitory computer-readable medium described herein, the UE capability message includes a first indication of support for a source base station resource allocation scheme and a second indication of support for a target base station resource allocation scheme, where the dual-base station control resource allocation scheme may be based on the first indication and the second indication.

In some examples of the method, apparatuses, and non-transitory computer-readable medium described herein, the UE capability message includes a single indication of support for the dual-base station control resource allocation scheme.

In some examples of the method, apparatuses, and non-transitory computer-readable medium described herein, the first set of control channel monitoring resources may be in a same frequency range as the second set of control channel monitoring resources.

In some examples of the method, apparatuses, and non-transitory computer-readable medium described herein, the first set of control channel monitoring resources may be in a different frequency range as the second set of control channel monitoring resources.

In some examples of the method, apparatuses, and non-transitory computer-readable medium described herein, the UE supported control channel monitoring resources include at least one of PDCCH candidates that the UE attempts blind decoding, a CCE candidate location of PDCCH that the UE performs channel estimation, or a combination thereof.

DETAILED DESCRIPTION

Figure 1:
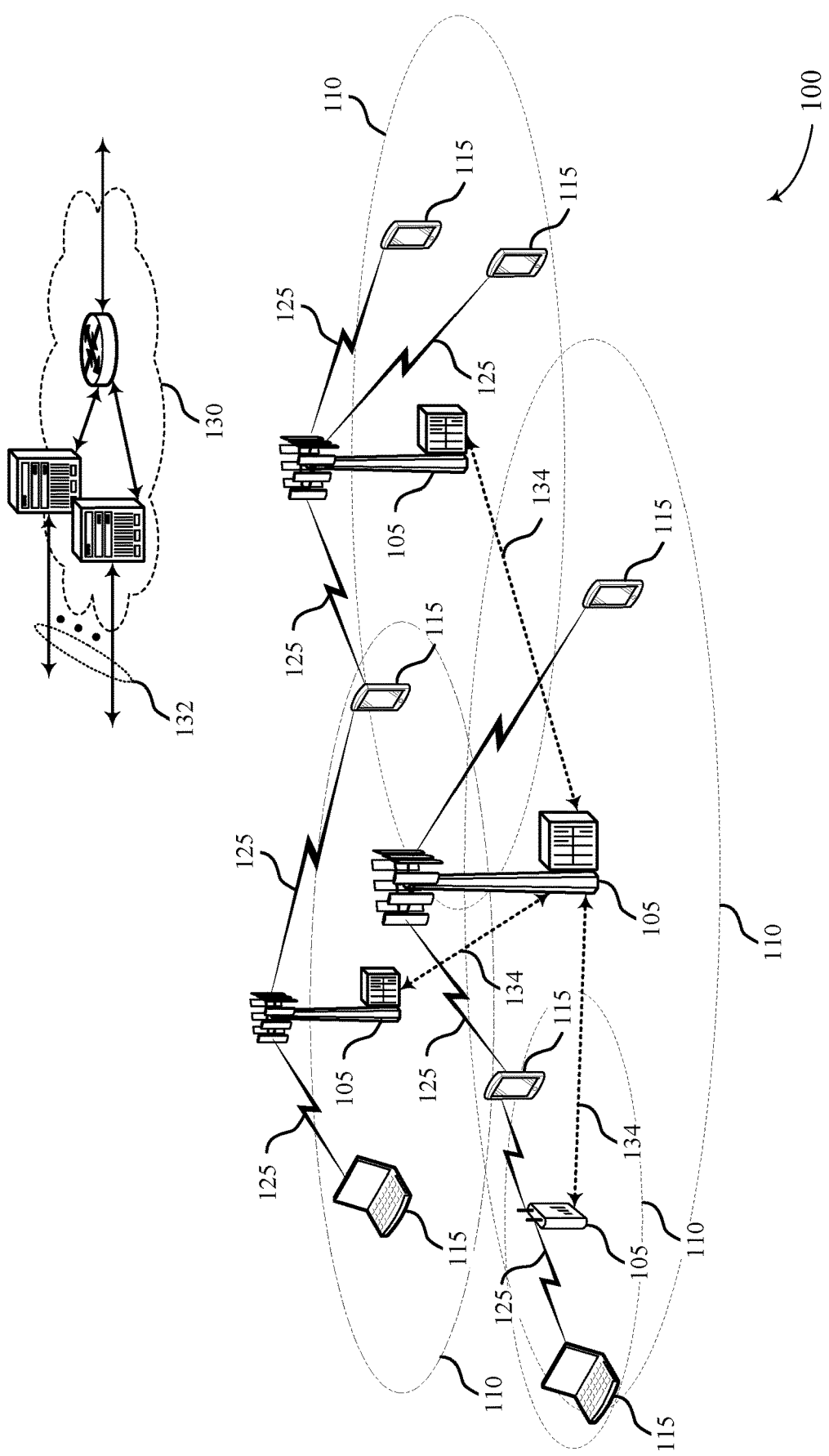
FIG. 1 illustrates an example of a system for wireless communications that supports simultaneous control information reception from source and target cells during handover in accordance with aspects of the present disclosure.

Wireless communication systems may use mobility management functions to manage the connectivity between a user equipment (UE) and the at least one base station or cell. For example, the mobility management function may initiate or otherwise support a handover procedure of the UE from a source base station to a target base station due to UE mobility, deteriorating channel conditions between the UE and the source base station, and the like. Some handover procedures may be considered a break-before-make (BBM) handover procedure where the UE unexpectedly loses connectivity to the source base station before (or during) establishing connectivity to the target base station. Other handover procedures may be considered a make-before-break (MBB) handover procedure where the UE maintains at least some degree of connectivity to both the source base station and the target base station during a handover procedure, or at least a portion of the handover procedure. For example, during an MBB handover procedure the UE may be configured with various channels (e.g., control channels, data channels, etc.) with the target base station in addition to the channels configured for the UE by the source base station. However, this approach may be problematic in that some UEs may not be able to maintain full connectivity to both the source and target base stations over all available resources during a handover procedure. For example, some UEs (e.g., low-tier UEs, wearable devices, etc.) may not support monitoring every control channel monitoring resource from both the source and target base stations at the same time. Accordingly, aspects of the described techniques provide a mechanism that support simultaneous control information reception from both source and target base stations during the MBB handover procedure.

Aspects of the disclosure are initially described in the context of a wireless communications system. Generally, aspects of the described techniques provide various mechanisms to improve a UE being able to receive control information from both a source and target base station during a handover procedure, such as an MBB handover procedure. For example, the UE may be connected to the source base station and implementing mobility management functions to ensure the UE maintains connectivity. This may result in a handover of the UE from the source to a target base station, e.g., due to UE mobility. In some examples, the handover procedure may be an MBB handover procedure where the UE is connected to both the source and target base stations, at least to some degree, during the handover procedure. For example, the UE may transmit or otherwise provide a UE capability message to the source base station (e.g., during an initial connection establishment procedure) that carries or conveys an indication of support by the UE for a dual-base station resource allocation scheme during the MBB handover procedure. This may include an indication that the UE supports dividing the number of control channel monitoring resource supported by the UE between the source base station and the target base station. The division may be symmetrical or asymmetrical. Accordingly, the UE may identify (e.g., be configured with) a first set of control channel monitoring resources for the source base station and a second set of control channel monitoring resources for the target base station. Generally, the control channel monitoring resources in the first set and the second set may be limited such that the cumulative control channel monitoring resources do not exceed the maximum number of UE supported control channel monitoring resources. Accordingly, the UE may receive control information during the MBB handover procedure from the source base station during (or using) the first set of control channel monitoring resources and from the target base station during (or using) the second set of control channel monitoring resources. The dual-base station resource allocation scheme supported by, and configured for, the UE may enable UEs supporting a reduced number of control channel monitoring resources (e.g., low-tier UEs, wearable devices, etc.) during the MBB handover procedure.

Aspects of the disclosure are further illustrated by and described with reference to apparatus diagrams, system diagrams, and flowcharts that relate to simultaneous control information reception from source and target cells during handover.

FIG. 1 illustrates an example of a wireless communications system 100 that supports simultaneous control information reception from source and target cells during handover in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may transmit a UE capability message indicating support for a dual-base station control resource allocation scheme during an MBB handover procedure from a source base station 105 to a target base station 105, wherein the dual-base station control resource allocation scheme comprises dividing a maximum number of UE supported control channel monitoring resources between the source base station 105 and the target base station 105. The UE 115 may identify, based at least in part on the dual-base station control resource allocation scheme, a first set of control channel monitoring resources for the source base station 105 and a second set of control channel monitoring resources for the target base station 105. The UE 115 may receive, during the MBB handover procedure, control information from the source base station 105 during the first set of control channel monitoring resources and from the target base station 105 during the second set of control channel monitoring resources.

A base station 105 (which may be considered a source or serving base station 105 in this context) may receive a UE capability message indicating support for a dual-base station control resource allocation scheme during an MBB handover procedure of the UE 115 from the source base station 105 to a target base station 105, wherein the dual-base station control resource allocation scheme comprises dividing a maximum number of UE supported control channel monitoring resources between the source base station 105 and the target base station 105. The base station 105 may select, based at least in part on the dual-base station control resource allocation scheme, a first set of control channel monitoring resources for the source base station 105 and a second set of control channel monitoring resources for the target base station 105. The base station 105 may transmit, during the MBB handover procedure, source base station control information from the source base station 105 during the first set of control channel monitoring resources while the target base station 105 transmits target base station control information during the second set of control channel monitoring resources.

Figure 2:
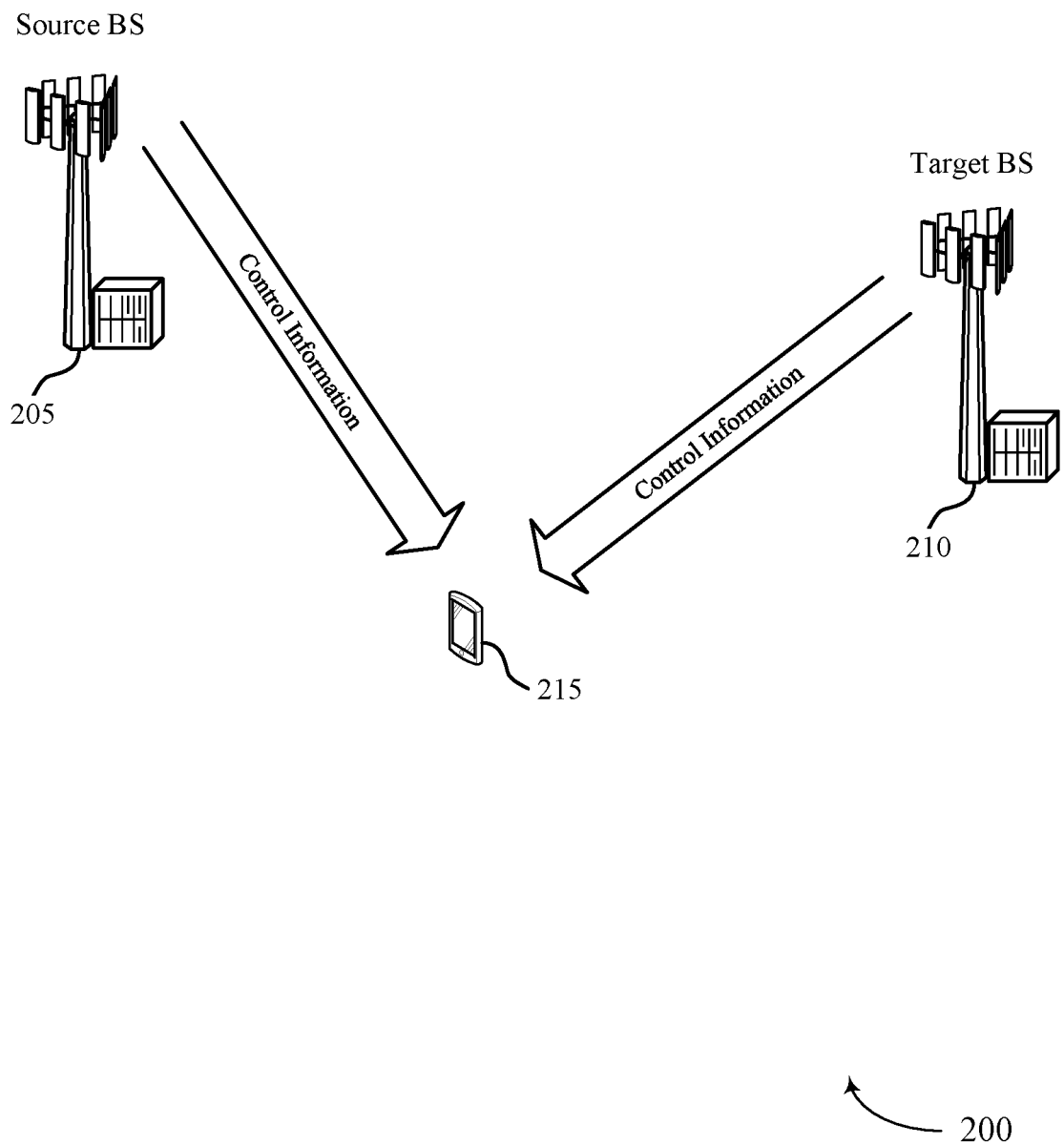
FIG. 2 illustrates an example of a wireless communication system that supports simultaneous control information reception from source and target cells during handover in accordance with aspects of the present disclosure.

FIG. 2 illustrates an example of a wireless communication system 200 that supports simultaneous control information reception from source and target cells during handover in accordance with aspects of the present disclosure. In some examples, wireless communication system 200 may implement aspects of wireless communication system 100. Wireless communication system 200 may include source base station 205, target base station 210, and UE 215, which may be examples of corresponding devices described herein.

Wireless communication systems, such as wireless communication system 200, generally utilize mobility enhancement functionalities that are designed to reduce or otherwise eliminate interruption time during a handover procedure. For example, during an MBB handover procedure, UE 215 may maintain connection to the source base station 205 with reception of a handover command until UE 215 executes an initial uplink/downlink transmission/reception to/from target base station 210. While maintaining simultaneous connectivity to both base stations, UE 215 is typically required to receive/transmit signals from/to both base stations. This may be accomplished using spatial division multiplexing (e.g., multi-link using multi-beam/multi-panel connectivity), TDM, FDM (e.g., CA/dual connectivity (DC) using two groups of carriers from the source and target base stations, respectively), or CDM (e.g., different scrambling sequences, dynamic spectrum sharing (DSS), etc., similar to a soft handover procedure).

One non-limiting example of this includes an MBB intra-base station handover procedure where a central unit (CU) function of a base station (e.g., a gNB) manages multiple distributed unit (DU) functions, where the UE is handed over from one DU function (the source cell or base station in this context) to a different DU function (the target cell or base station in this context) of the base station. In this example, the control plane connection to the core network may not change during the handover procedure, e.g., due to UE mobility among cells under different gNB-DUs that share the same gNB-CU. A single security context may be maintained from the source gNB-DU to the target gNB-DU.

In this example, the MBB handover may begin with an event trigger (e.g., a poor channel performance measurement between the UE and the source gNB-DU or a better channel performance measurement between the UE and the target base gNB-DU than the source gNB-DU). Based on the event trigger, the UE may transmit a measurement report to its source base station (e.g., the source gNB-DU) that is forwarded to the gNB-CU. The gNB-CU may make the determination that a handover is warranted and therefore initiate an MBB handover procedure from the source base station (e.g., source gNB-DU) to a target base station (e.g., a target gNB-DU that shares the gNB-CU with the source gNB-DU). This may include a UE context establishment using a request/response exchange between the gNB-CU and the target gNB-DU where the gNB-CU established some degree of context of the UE for the target gNB-DU. Next the gNB-CU may transmit or otherwise provide a reconfiguration signal (e.g., RRCReconfiguration) to the UE via the source gNB-DU that carries or conveys an indication of a cell group configuration, reconfiguration with synchronization, MBB handover indication, and the like. The UE may continue its data transmission/reception with the source gNB-DU while connecting to the target gNB-DU (e.g., establishes some degree of synchronization and an RRC connection with the target gNB-DU). Accordingly and at this point during the MBB handover procedure, the UE maintains connectivity with both the source and target gNB-DUs. The UE may transmit an RRC connection reconfiguration complete message to the target gNB-DU that is forwarded to the gNB-CU, which makes a decision to release the connection between the UE and the source gNB-DU. Accordingly, the gNB-CU and source gNB-DU may exchange UE context modification request/response signaling, which is followed by the gNB-CU transmitting an RRC reconfiguration message to the UE via the target gNB-DU. The RRC reconfiguration message carriers or conveys an indication releasing the source gNB-DU cell group for the UE. Accordingly and at this point during the MBB handover procedure, the UE drops its connectivity with the original source gNB-DU and, instead, communicates via the target gNB-DU (which is now the new source gNB-DU for the UE). The UE may transmit an RRC reconfiguration complete message to the gNB-CU via the new source gNB-DU (e.g., the original target gNB-DU) which triggers UE context release signaling between the original source gNB-DU and the gNB-CU. Accordingly, during a significant portion of the MBB handover procedure, the UE is expected to maintain simultaneous connectivity with both the source and target base stations (e.g., source gNB-DU and target gNB-DU in this context). Although the intra-gNB MBB handover procedure is described as one example above, it is the understood that the MBB handover procedure may be an inter-gNB handover procedure from one gNB to another gNB.

In the situation where a collision occurs (e.g., UE 215 cannot receive/transmit from/to both base stations simultaneously), UE 215 may prioritize one base station/channel/signal, and drop the other based on rules such as, but not limited to, base station priority, channel/signal priority, quality of service (QOS)-based priority, and the like.

However, UE 215 may not be able to maintain connectivity to both the source and target base stations simultaneously. For example, the UE ability to receive control information in a CA/DC scenario may be limited due to UE capability. That is, due to the complexity and processing timeline issues associated with dual-connectivity during the MBB handover procedure, the capability of UE 215 to monitor for control information (e.g., PDCCH) may be limited. The limitation may be based on a maximum number of PDCCH candidates monitoring occasions per slot, a maximum number of non-overlapping control channel elements (CCEs) monitored per slot, and the like, that UE 215 supports. In one example, UE 215 may be a certain type of UE (e.g., low-tier UE, wearable device, IoT device, etc.), with the type of UE being associated with such limitations.

As one non-limiting example and in a CA case, UE 215 supporting more than four CCs may report its PDCCH monitoring capability (e.g., $N_{cells}^{cap}$, or pdcch-BlindDetectionCA) to its source base station. If the number of downlink CCs ($N_{cell}^{DL}$) configured for UE 215 is less than or equal to $N_{cells}^{cap}$, UE 215 can monitor up to $M_{PDCCH}^{max,slot,u}$ PDCCH candidates and up to $C_{PDCCH}^{max,slot,u}$ non-overlapping CCEs per slot per cell. Otherwise (e.g., $N_{cells}^{DL} > N_{cells}^{cap}$), UE 215 may monitor up to $N_{cells}^{cap}$ PDCCH candidates and up to $N_{cells}^{cap} * C_{PDCCH}^{max,slot,u}$ non-overlapped overlapped CCEs per slot across all configured cells. In this context, u may correspond to at least one of:

| u | Max # of Monitored PDCCH Candidates Per Slot and Per Serving Cell $M_{PDCCH}^{max,slot,u}$ |
|---|---|
| 0 | 44 |
| 1 | 36 |
| 2 | 22 |
| 3 | 20 | and/or

| u | Max # of Non-Overlapped CCEs Per Slot and Per Serving Cell $C_{PDCCH}^{max,slot,u}$ |
|---|---|
| 0 | 44 |
| 1 | 36 |
| 2 | 22 |
| 3 | 20 |

When UE 215 is connected with two cells (e.g., source base station 205 and target base station 210), during the MBB handover procedure and monitoring PDCCH from both cells, the same or similar UE capability limitation may be applied. Due to the priorities of two cells and the number of CCs for each cell that may be different, the UE's overall PDCCH capability may be asymmetrically divided between cells.

Accordingly, aspects of the described techniques provide various mechanisms that may support the UE 215 receiving control information simultaneously from both the source base station 205 and the target base station 210 during an MBB handover procedure. For example and for an inter-band MBB handover procedure, UE 215 may maintain a connection using a first component carrier (e.g., CC1) with source base station 205 while establishing a connection with target base station 210 using a second component carrier (e.g., CC2). UE 215 may transmit and receive simultaneously on both CCs (e.g., CC1 in frequency range one (FR1) and CC2 in FR2, or vice versa).

UE 215 may transmit a UE capability message to source base station 205 indicating support for a dual-base station control resource allocation scheme during the MBB handover procedure from source base station 205 to target base station 210. In some aspects, the dual-base station control resource allocation scheme may include dividing a maximum number of UE supported control channel monitoring resources between the source base station 205 and target base station 210. Broadly, each control channel monitoring resource may include time-frequency resources in which UE 215 monitors for control information transmitted over a control channel (e.g., PDCCH) from each of source base station 205 and target base station 210. In some aspects, UE 215 capability signaling may include indicating the same (or similar) UE capability for CA PDCCH monitoring (e.g., $N_{cells}^{cap}$, or pdcch-BlindDetectionCA) being used for the MBB handover procedure. Alternatively, UE 215 supporting the MBB handover procedure may report separate PDCCH monitoring capabilities for the source base station 205 and the target base station 210. For example, UE 215 may report $N_{cells}^{Source}$ and $N_{cells}^{Target}$ in its UE capability message, where $N_{cells}^{Source} + N_{cells}^{Target} \leq N_{cells}^{Cap}$.

Accordingly, UE 215, source base 205, and/or target base station 210 may select, identify, or otherwise determine (according to the dual-base station control resource allocation scheme indicated in the UE capability message) a first set of control channel monitoring resources for the source base station 205 and a second set of control channel monitoring resources for the target base station 210. In some aspects, the UE capability for monitoring PDCCH (e.g., $N_{cells}^{Cap}$) may be distributed between the source base station 205 and the target base station 210. In some aspects, the source base station 205 and target base station 210 may coordinate (e.g., over a backhaul network, via the core network, etc.) in selecting the first and second sets of control channel monitoring resources. In another example, the source base station 205 may send a signal to the target base station 210 indicating or otherwise identifying the selected resources for target base station 210.

In a first example, when UE 215 reports separate PDCCH monitoring capabilities for the source base station 205 and target base station 210 in its UE capability message, a rule for determining the maximum number of monitored PDCCH candidates and non-overlapped CCEs (e.g., the control channel monitoring resources) may be applied. That is, the maximum number of monitored PDCCH candidates and non-overlapped CCEs can be applied to each base station, e.g., by replacing $N_{cells}^{Cap}$ with $N_{cells}^{Source}$ and $N_{cells}^{Target}$, respectively.

In another example, when UE 215 reports a single PDCCH monitoring capability (e.g., $N_{cells}^{Cap}$) to use for the MBB handover procedure, a rule for determining the maximum number of monitored PDCCH candidates and non-overlapped CCEs (e.g., the control channel monitoring resources) may be applied. This may include, regardless of the base stations (or cells), the same rule being applied for all aggregated CCs of the source base station 205 and target base station 210. Alternatively, the maximum number of monitored PDCCH candidates and non-overlapped CCEs (e.g., the control channel monitoring resources) may be asymmetrically divided between the two base stations based on a predetermined/configured rule. The rule (e.g., a scaling factor) may be based on the priority of the base stations (e.g., the target base station 210 may be prioritized for early termination of the handover procedure, the source base station 205 may be prioritized to reduce a ping-pong effect, and the like). The rule may be based on the numerology of the base stations (or cells), the number of CCs configured for each base station, and the like.

Accordingly and during the MBB handover procedure, source base station 205 may transmit control information to UE 215 using the first set of control channel monitoring resources while target base station 210 transmits control information to UE 215 using the second set of control channel monitoring resources. Accordingly, aspects of the described techniques provide a mechanism whereby the maximum number of control channel monitoring resources supported by UE 215 are divided between the source base station 205 and target base station 210 during the MBB handover procedure in a manner that ensures UE 215 can receive the control information from both base stations.

Although the techniques described above are generally in terms of an inter-band MBB handover procedure, it is to be understood that these techniques may also be applied for UE 215 is capable of simultaneous reception from the source base station 205 and target base station 210 (e.g., multi-beam connectivity, such as in a mmW network).

Figure 3:
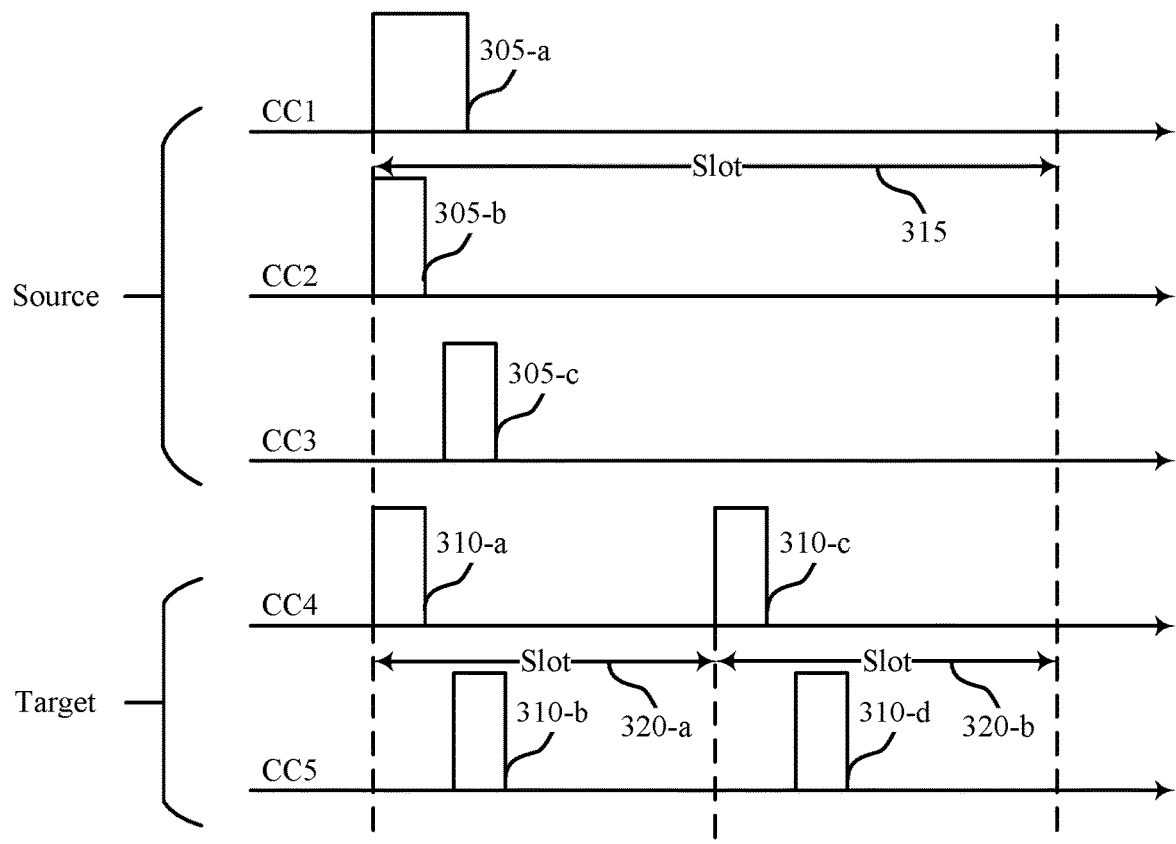
FIG. 3 illustrates an example of a control resource configuration that supports simultaneous control information reception from source and target cells during handover in accordance with aspects of the present disclosure.

FIG. 3 illustrates an example of a control resource configuration 300 that supports simultaneous control information reception from source and target cells during handover in accordance with aspects of the present disclosure. In some examples, control resource configuration 300 may implement aspects of wireless communication systems 100 and/or 200. Aspects of control resource configuration 300 may be implemented by a UE and/or base station, which may be examples of the corresponding devices described herein. More particular, aspects of control resource configuration 300 may be implemented by a source base station and target base station involved in an inter-band CA MBB handover procedure of the UE where the same UE capability for CA PDCCH monitoring is used.

As discussed above, the UE may transmit or otherwise provide a UE capability message that carries or conveys an indication of support for a dual-base station control resource allocation scheme during the MBB handover procedure. Generally, the dual-base station control resource allocation scheme may include dividing a maximum number of UE supported control channel monitoring resources (e.g., PDCCH candidates and/or non-overlapped CCEs) between the source base station and the target base station.

In the example illustrated in control resource configuration 300, source base station may be configured with three component carriers (e.g., CC1, CC2, and CC3) where the target base station may can be configured with two component carrier (e.g., CC4 and CC5) for the UE. However, it is to be understood that more or fewer CCEs may be configured for the UE by the source base station and/or target base station. Accordingly, during the MBB handover procedure the UE may maintain simultaneous connectivity with the source base station on CC1, CC2, and/or CC3 and with the target base station on CC4 and/or CC5. In some aspects, the CCs (e.g., CC1-CC5) may use the same or different numerologies.

According to the dual-base station control resource allocation scheme indicated in the UE capability message, the total budget for the maximum number of PDCCH candidates and non-overlapped CCEs monitored by the UE per slot may be determined. That is, the source base station, target base station, and/or UE may select, identify, or otherwise determine a first set of control channel monitoring resources for the source base station and a second set of control channel monitoring resources for the target base station. Accordingly, the source base station may be assigned with control channel monitoring resources 305-a in CC1, control channel monitoring resources 305-b in CC2, and control channel monitoring resources 305-c in CC3 during slot 315. The target base station may be assigned with control channel monitoring resources 310-a in CC4 and control channel monitoring resources 310-b in CC5 during a first slot 320-a and with control channel monitoring resources 310-c in CC4 and control channel monitoring resources 310-d in CC5 during a second slot 320-b. In the example illustrated in control resource configuration 300, slot 315 and slots 320 may have a different duration due to a different subcarrier spacing between the source and target base stations, for example.

Broadly, the distribution of the resources between the first set of control channel monitoring resources and the second set of control channel monitoring resources may be symmetrical or asymmetrical.

In a symmetrical resource allocation scheme, each CC (from the source base station and/or target base station) may be assigned with a number of PDCCH candidates/CCEs. In this context, symmetric may mean that the same distribution rule is symmetrically applied for each CC, although the actual number may be different based on the CC's numerology. In an asymmetric resource allocation scheme, when the target base station is prioritized, each CC in the target base station may first be assigned with an unrestricted maximum number (e.g., $M_{PDCCH}^{max,slot,u}$), and the remainder are assigned for the source base g station. Accordingly, the number of supported control channel monitoring resources may be divided between the source base station and the target base station.

Accordingly, the UE may receive control information from the source base station using the first set of control channel monitoring resources (e.g., control channel monitoring resources 305 on CC1, CC2, and CC3) while simultaneously (at least to some degree) receiving control information from the target base station using the second set of control channel monitoring resources (e.g., control channel monitoring resources 310 on CC4 and CC5).

As discussed above, the same rule as in an inter-band handover case may be applied to other situations. For example, both CC1 of the source base station and CC4 of the target base station may be in the same frequency range band (e.g., FR1). Accordingly and in this band, no beamforming may be used for the PDCCH transmissions from the source base station and the serving base station (e.g., no QCL-typeD is applicable).

In other cases a different rule may be applied. For example both CC1 of the source base station and CC4 of the target base station may be in the same frequency range band (e.g., FR2). Accordingly and in this band, beamforming for PDCCH transmission may be used (e.g., QCL-typeD may be applicable across the CCs in the same band). If the UE is not capable of simultaneous reception (e.g., multi-beam/multi-panel reception), the UE may be required to prioritize one beam over another. In some aspects, this prioritization may be determined based on the base station (or cell), based on the channel/reference signal, based on the quality of service requirements, and the like. Based on the prioritization, if the UE is monitoring only one link (the source base station or the target base station) in a slot (e.g., slot-wise TDM), a CA PDCCH monitoring capability and the prioritization rule may be applied for each link. If the UE is monitoring both links in the slot (e.g., TDM within a slot), the same rule in an inter-band MBB handover procedure may be applied.

Figure 4:
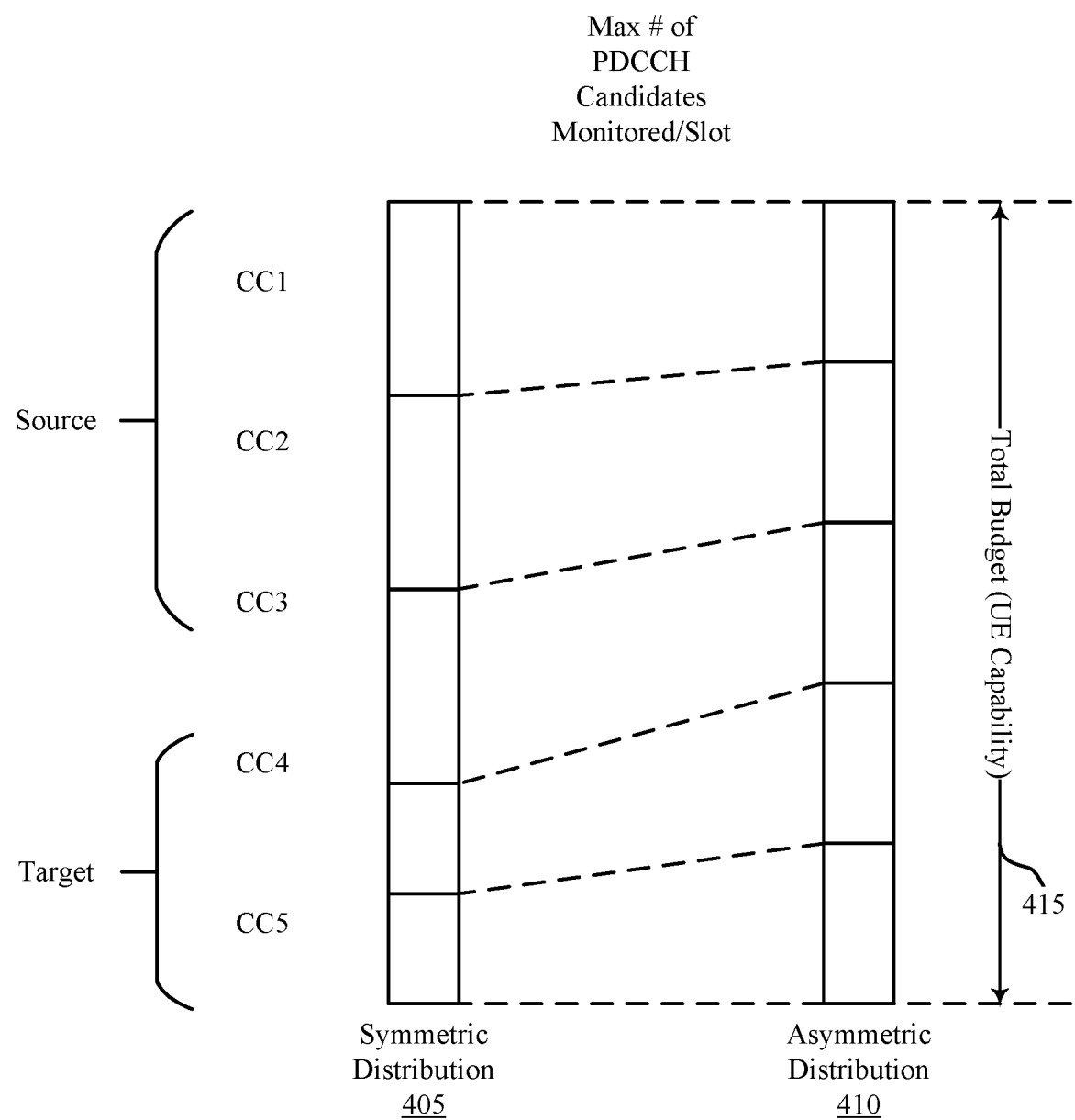
FIG. 4 illustrates an example of a control resource configuration that supports simultaneous control information reception from source and target cells during handover in accordance with aspects of the present disclosure.

FIG. 4 illustrates an example of a control resource configuration 400 that supports simultaneous control information reception from source and target cells during handover in accordance with aspects of the present disclosure. In some examples, control resource configuration 400 may implement aspects of wireless communication systems 100 and/or 200, and/or control resource configuration 300. Aspects of control resource configuration 400 may be implemented by a source base station, a target base station, and/or a UE, which may be examples of the corresponding devices described herein. Broadly, control resource configuration 400 illustrates an example allocation of control channel monitoring resources based on the maximum number of PDCCH candidates monitored per slot and/or the maximum number of non-overlapped CCEs monitored per slot.

Generally, control resource configuration 400 illustrates two examples of how the maximum number of PDCCH candidates and non-overlapped CCEs (e.g., the maximum number of supported control channel monitoring resources) can be allocated for a UE during an MBB handover procedure. As discussed above, the UE may transmit or otherwise provide a UE capability message that carries or otherwise conveys an indication of support for a dual-base station resource allocation scheme during the MBB handover procedure. In some aspects, the dual-base station control resource allocation scheme may include a scheme for the maximum number of UE supported control channel monitoring resources being divided between the source base station and the target base station.

As discussed, based on the UE capability message, a first set of control channel monitoring resources for the source base station and a second set of control channel monitoring resources for the target base station may be identified, selected, or otherwise determined for the UE to use during an MBB handover procedure. As also discussed, the first and second sets of control channel monitoring resources may be allocated symmetrically or asymmetrically.

For example and continuing with the example illustrated in control resource configuration 300 where the source base station uses CC1, CC2, and CC3, while the target base station uses CC4 and CC5, this may include a symmetric distribution 405 or an asymmetric distribution 410 of the total budget 415 of the maximum number of UEs supported control channel monitoring resources.

Broadly, the symmetric distributed 405 may include the same distribution rule will be applied for each CC, although the actual number of configured PDCCH candidates may be different per base station. That is, the same rule (e.g., weighting factor) may be applied to each CC of the source base station as is applied to each CC of the target base station in the symmetric distribution 405. Even though this may or may not result in the same number of PDCCH candidates being configured per CC in the first and second sets of control channel monitoring resources, this may ensure a fair allocation of such control channel monitoring resources for the source base station and the target base station. Conversely, the asymmetric distribution 410 may include applying different rules to each CC (or each base station) than is applied to the other CCs (or other base stations). As one example, this may include the target base station being prioritized, with each CC in the target base station being first assigned with the unrestricted maximum number of PDCCH candidates being monitored per slot. In this example, any remaining PDCCH candidates that can be supported by the UE may be assigned or otherwise allocated in the first set of control channel monitoring resources for the source base station.

Accordingly, the UE may receive control information from the source base station using the first set of control channel resources in CC1, CC2, and CC3, while the UE receives control information from the target base station using the second set of control channel resources in CC4 and CC5.

Figure 5:
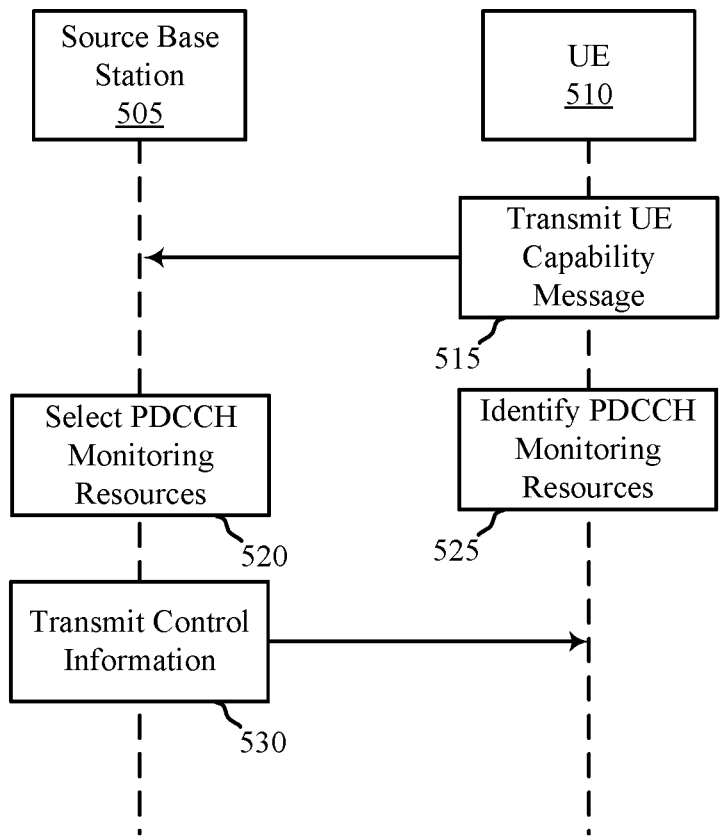
FIG. 5 illustrates an example of a process that supports simultaneous control information reception from source and target cells during handover in accordance with aspects of the present disclosure.

FIG. 5 illustrates an example of a process 500 that supports simultaneous control information reception from source and target cells during handover in accordance with aspects of the present disclosure. In some examples, process 500 may implement aspects of wireless communication systems 100 and/or 200, and/or control resource configurations 300 and/or 400. Process 500 may be implemented by source base station 505 and UE 510, which may be examples of corresponding devices described herein.

At 515, UE 5 110 may transmit (and source base station 505 may receive) a UE capability message carrying or otherwise conveying an indication of support for a dual-base station control resource allocation scheme during an MBB handover procedure from source base station 505 to a target base station. The dual-base station control resource allocation scheme may include dividing a maximum number of UE supported control channel monitoring resources between the source base station and the target base station.

In some aspects, this may include UE 510 generating the UE capability message to indicate support for a symmetric dual-base station control resource allocation scheme and/or an asymmetric dual-base station control resource allocation scheme. In some aspects, the first set of control channel monitoring resources may include a balanced number of control channel monitoring resources as the second set of control channel monitoring resources in the symmetric dual-base station control resource allocation scheme. In some aspects, the first set of control channel monitoring resources may include an unbalanced number of control channel monitoring resources as the second set of control channel monitoring resources in the asymmetric dual-base station control resource allocation scheme.

In some aspects, this may include UE 510 generating the UE capability message to include a first indication of support for a source base station resource allocation scheme and a second indication of support for a target base station resource allocation scheme. In some aspects, this may include UE 510 generating the UE capability message to include a single indication of support for the dual-base station control resource allocation schemes.

In some aspects, the UE supported control channel monitoring resources may include PDCCH candidate(s) that UE 510 attempts blind decoding on and/or CCE candidate locations of PDCCH that UE 510 performs channel estimation on.

At 520, the source base station 505 may select, based on the dual-base station control resource allocation scheme indicated in the UE capability message, a first set of control channel monitoring resources for the source base station 505 and a second set of control channel monitoring resources for the target base station.

In some aspects, this may include source base station 505 identifying a base station priority of the source base station 505 and the target base station, a numerology of the source base station 505 and the target base station, and/or a number of CCs associated with the source base station 505 and the target base station.

In some aspects, this may include base station 505 providing an indication of the second set of control channel monitoring resources to the target base station during the MBB handover procedure. In some aspects, this may include base station 505 coordinating with the target base station during the MBB handover procedure to select the first set of control channel monitoring resources and the second set of control channel monitoring resources. For example, source base station 505 and the target base station may coordinate over a backhaul network, a core network, and/or a CU function associated with the source base station and target base station (e.g., a gNB-CU function).

In some aspects, this may include source base station 505 determining that UE 510 supports at least one of a symmetric and/or an asymmetric dual-base station control resource allocation scheme. In some aspects, the symmetric dual-base station control resource allocation scheme may include the first set of control channel monitoring resources including a balanced number of control channel monitoring resources as the second set of control channel monitoring resources. In some aspects, the asymmetric dual-base station control resource allocation scheme may include the first set of control channel monitoring resources including an unbalanced number of control channel monitoring resources as the second set of control channel monitoring resources.

At 525, UE 510 may identify, based on the dual-base station control resource allocation scheme, the first set of control channel monitoring resources for source base station 505 and the second set of control channel monitoring resources for the target base station. In some aspects, the first set of control channel monitoring resources may be in the same frequency range or in a different frequency range as the second set of control channel monitoring resources. In some aspects, the source base station 505 may transmit a signal to UE 510 indicating the selected first and second sets of control channel monitoring resources.

At 530, UE 510 may receive control information, during the MBB handover procedure, from the source base station 505 using the first set of control channel monitoring resources and also receive control information from the target base station using the second set of control channel monitoring resources.

When using the same frequency range, this may include UE 510 receiving the control information from the source base station 505 using the first set of control channel monitoring resources using a first beamformed configuration and receiving the control information from the target base station using the second set of control channel monitoring resources using a second beamformed configuration that is different from the first beamformed configuration. When using a different frequency range, this may include UE 510 receiving the control information from the source base station using the first set of control channel monitoring resources over a first frequency range and receiving the control information from the target base station using the second set of control channel monitoring resources over a second frequency range that is different from the first frequency range.

Figure 6:
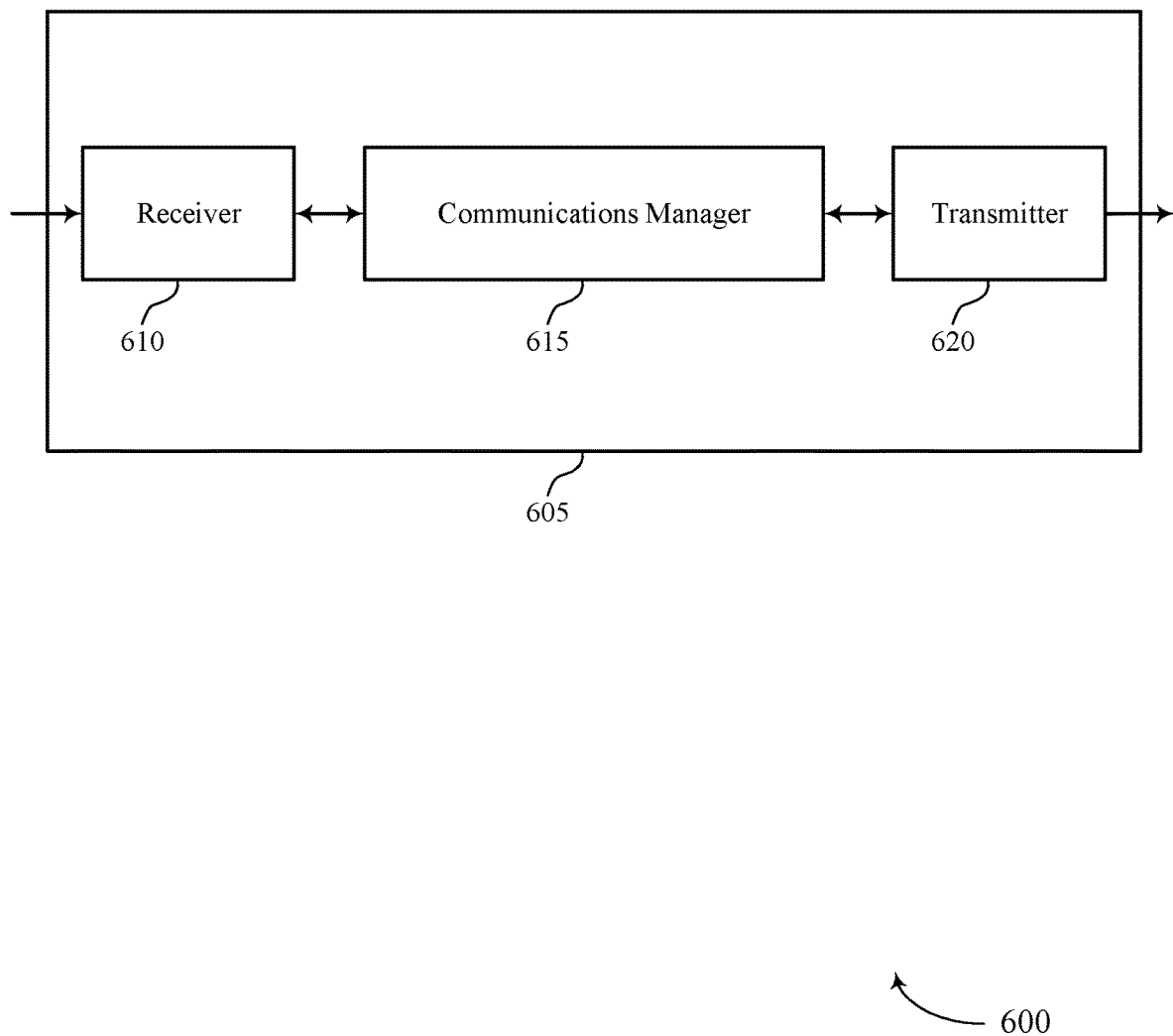
FIGS. 6 and 7 show block diagrams of devices that support simultaneous control information reception from source and target cells during handover in accordance with aspects of the present disclosure.

FIG. 6 shows a block diagram 600 of a device 605 that supports simultaneous control information reception from source and target cells during handover in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to simultaneous control information reception from source and target cells during handover, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may transmit a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station, identify, based on the dual-base station control resource allocation scheme, a first set of control channel monitoring resources for the source base station and a second set of control channel monitoring resources for the target base station, and receive, during the MBB handover procedure, control information from the source base station during the first set of control channel monitoring resources and from the target base station during the second set of control channel monitoring resources. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
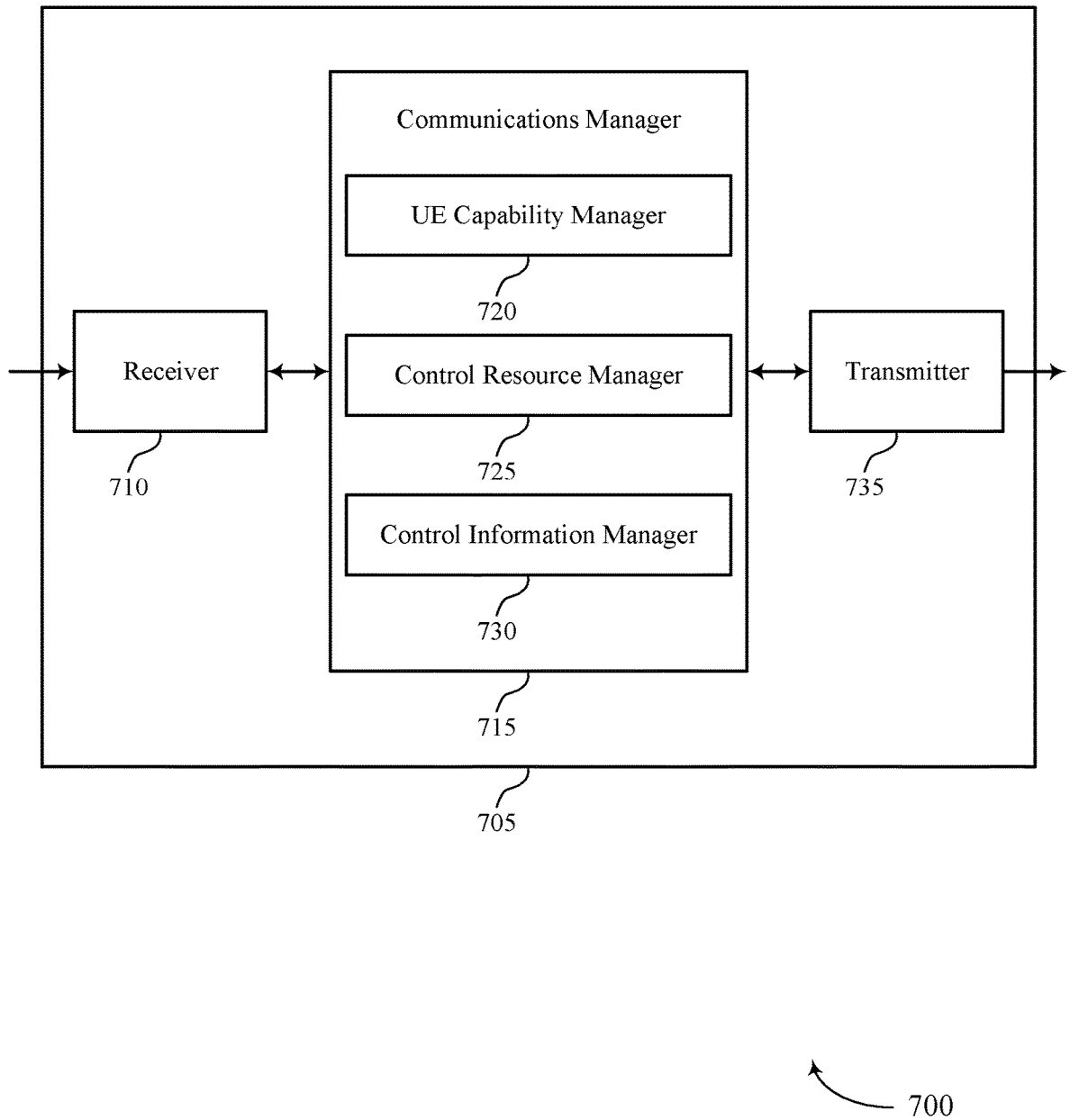

FIG. 7 shows a block diagram 700 of a device 705 that supports simultaneous control information reception from source and target cells during handover in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to simultaneous control information reception from source and target cells during handover, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an UE capability manager 720, a control resource manager 725, and a control information manager 730. The communications manager 715 may be an example of aspects of the communications manager 910 described herein.

The UE capability manager 720 may transmit a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station.

The control resource manager 725 may identify, based on the dual-base station control resource allocation scheme, a first set of control channel monitoring resources for the source base station and a second set of control channel monitoring resources for the target base station.

The control information manager 730 may receive, during the MBB handover procedure, control information from the source base station during the first set of control channel monitoring resources and from the target base station during the second set of control channel monitoring resources.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
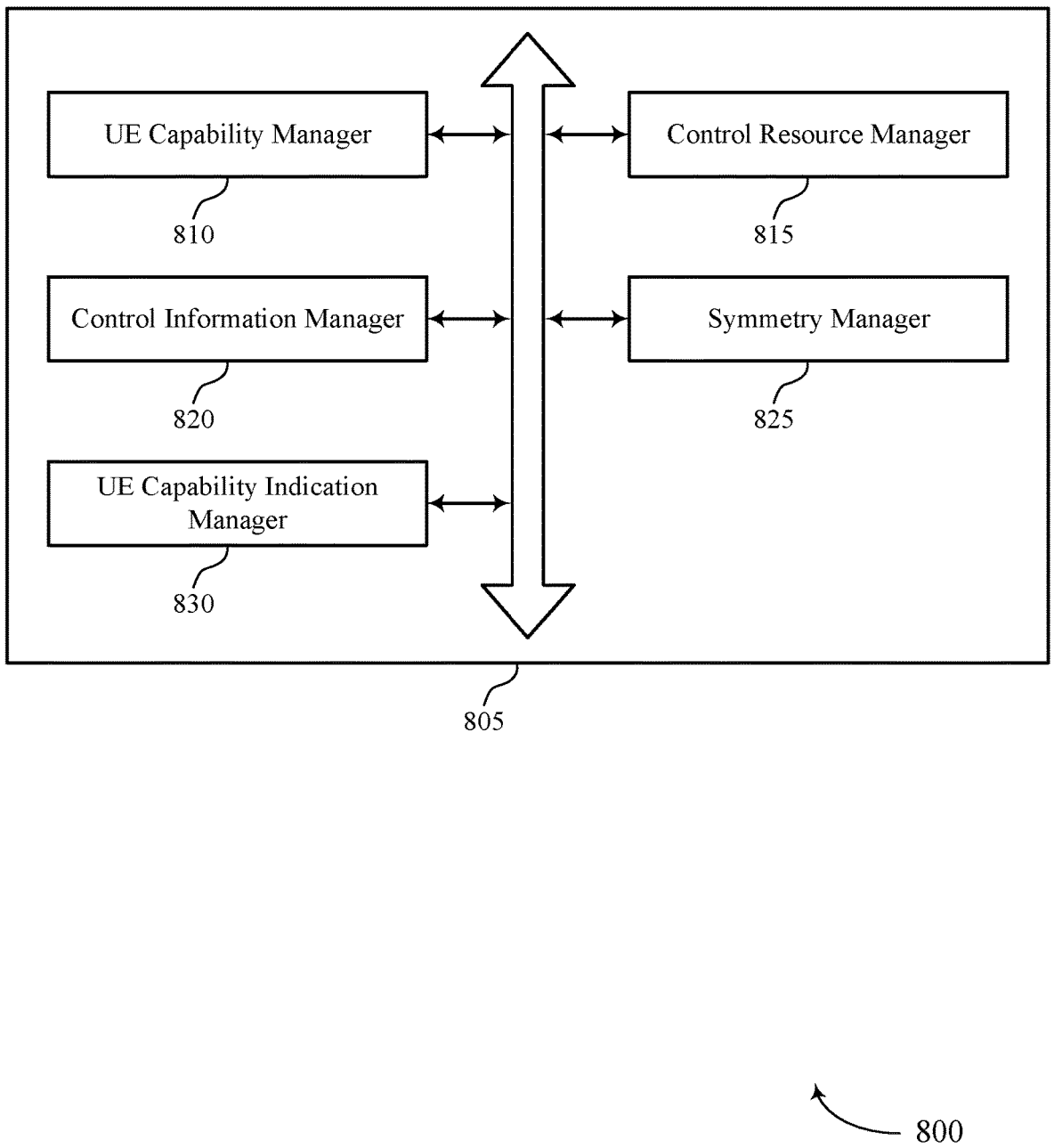
FIG. 8 shows a block diagram of a communications manager that supports simultaneous control information reception from source and target cells during handover in accordance with aspects of the present disclosure.

FIG. 8 shows a block diagram 800 of a communications manager 805 that supports simultaneous control information reception from source and target cells during handover in accordance with aspects of the present disclosure. The communications manager 805 may be an example of aspects of a communications manager 615, a communications manager 715, or a communications manager 910 described herein. The communications manager 805 may include an UE capability manager 810, a control resource manager 815, a control information manager 820, a symmetry manager 825, and an UE capability indication manager 830. Each of these modules may communicate, directly or indirectly, with one another (e.g., via one or more buses).

The UE capability manager 810 may transmit a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station.

The control resource manager 815 may identify, based on the dual-base station control resource allocation scheme, a first set of control channel monitoring resources for the source base station and a second set of control channel monitoring resources for the target base station. In some examples, the control resource manager 815 may receive the control information from the source base station during the first set of control channel monitoring resources using a first beamform configuration. In some examples, the control resource manager 815 may receive the control information from the target base station during the second set of control channel monitoring resources using a second beamform configuration that is different from the first beamform configuration.

In some examples, the control resource manager 815 may receive the control information from the source base station during the first set of control channel monitoring resources over a first frequency range. In some examples, the control resource manager 815 may receive the control information from the target base station during the second set of control channel monitoring resources over a second frequency range that is different from the first frequency range. In some cases, the first set of control channel monitoring resources are in a same frequency range as the second set of control channel monitoring resources.

In some cases, the first set of control channel monitoring resources are in a different frequency range as the second set of control channel monitoring resources. In some cases, the UE supported control channel monitoring resources include at least one of PDCCH candidates that the UE attempts blind decoding, a CCE candidate location of PDCCH that the UE performs channel estimation, or a combination thereof.

The control information manager 820 may receive, during the MBB handover procedure, control information from the source base station during the first set of control channel monitoring resources and from the target base station during the second set of control channel monitoring resources.

The symmetry manager 825 may generate the UE capability message to indicate support for at least one of a symmetric dual-base station control resource allocation scheme, or an asymmetric dual-base station control resource allocation scheme, or a combination thereof. In some cases, the first set of control channel monitoring resources include a balanced number of control channel monitoring resources as the second set of control channel monitoring resources in the symmetric dual-base station control resource allocation scheme. In some cases, the first set of control channel monitoring resources include an unbalanced number of control channel monitoring resources as the second set of control channel monitoring resources in the asymmetric dual-base station control resource allocation scheme.

The UE capability indication manager 830 may generate the UE capability message to include a first indication of support for a source base station resource allocation scheme and a second indication of support for a target base station resource allocation scheme, where the dual-base station control resource allocation scheme is based on the first indication and the second indication. In some examples, the UE capability indication manager 830 may generate the UE capability message to include a single indication of support for the dual-base station control resource allocation scheme.

Figure 9:
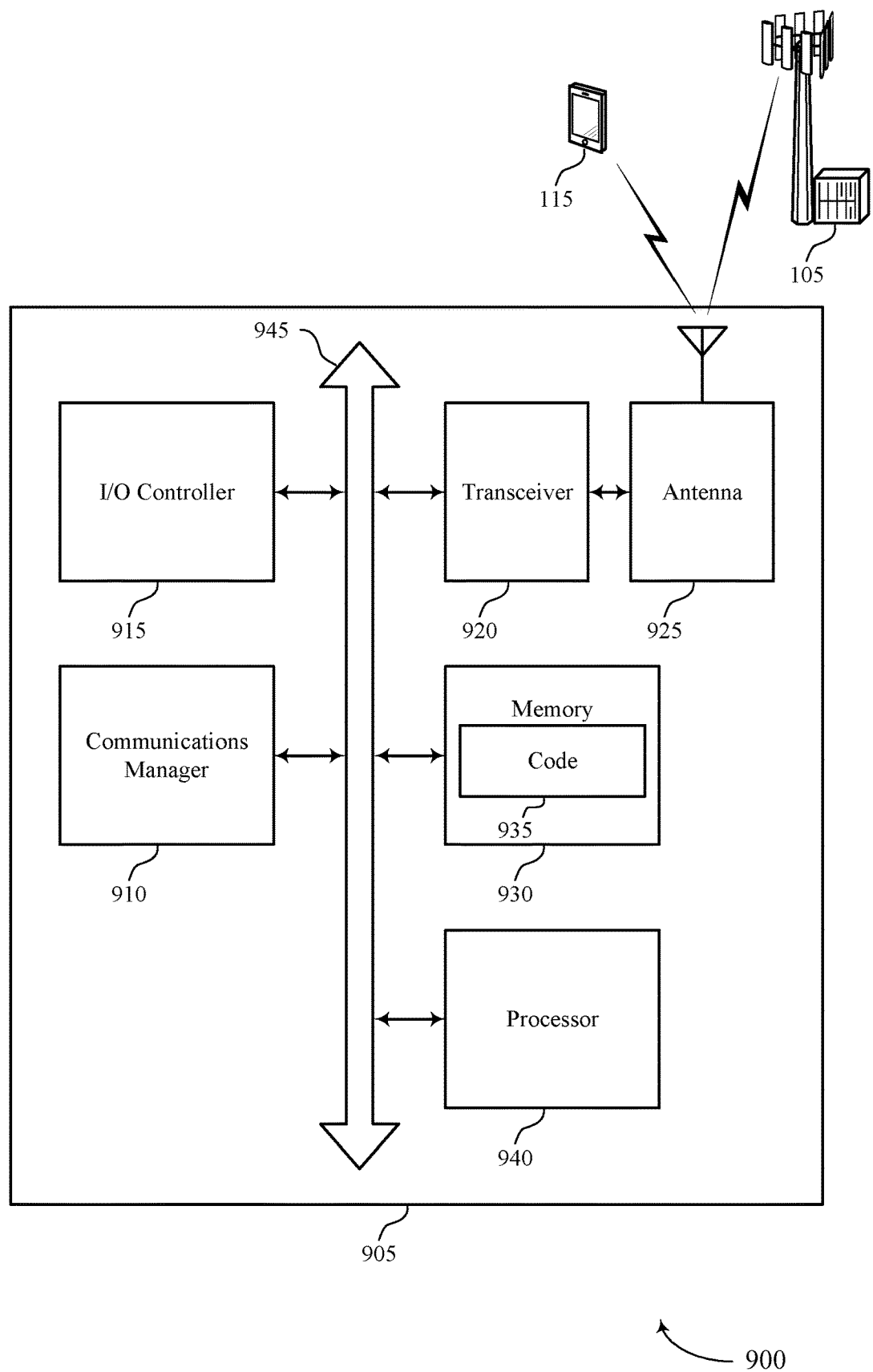
FIG. 9 shows a diagram of a system including a device that supports simultaneous control information reception from source and target cells during handover in accordance with aspects of the present disclosure.

FIG. 9 shows a diagram of a system 900 including a device 905 that supports simultaneous control information reception from source and target cells during handover in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may transmit a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station, identify, based on the dual-base station control resource allocation scheme, a first set of control channel monitoring resources for the source base station and a second set of control channel monitoring resources for the target base station, and receive, during the MBB handover procedure, control information from the source base station during the first set of control channel monitoring resources and from the target base station during the second set of control channel monitoring resources.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting simultaneous control information reception from source and target cells during handover).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
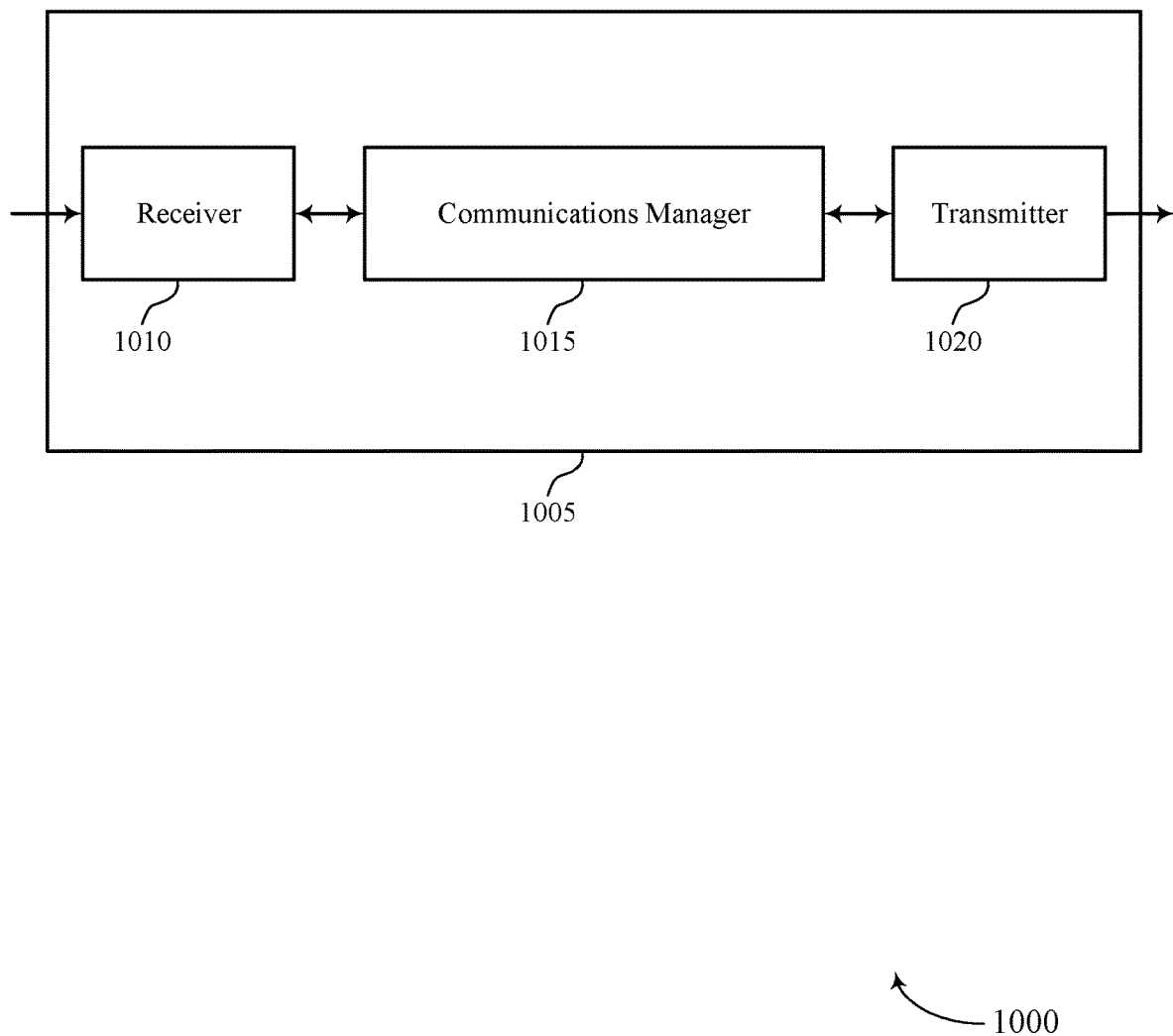
FIGS. 10 and 11 show block diagrams of devices that support simultaneous control information reception from source and target cells during handover in accordance with aspects of the present disclosure.

FIG. 10 shows a block diagram 1000 of a device 1005 that supports simultaneous control information reception from source and target cells during handover in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to simultaneous control information reception from source and target cells during handover, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station, select, based on the dual-base station control resource allocation scheme, a first set of control channel monitoring resources for the source base station and a second set of control channel monitoring resources for the target base station, and transmit, during the MBB handover procedure, source base station control information from the source base station during the first set of control channel monitoring resources while the target base station transmits target base station control information during the second set of control channel monitoring resources. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
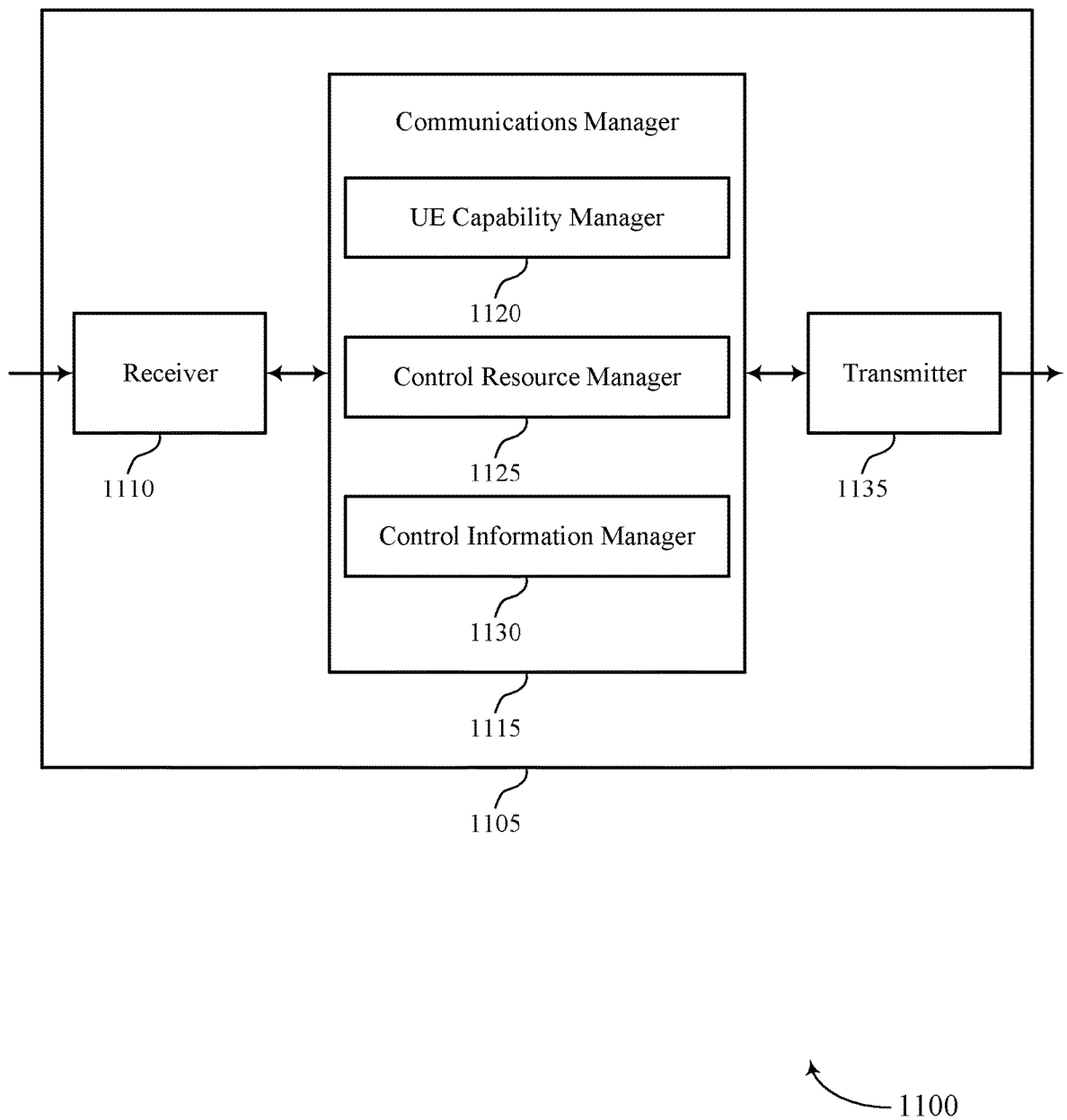

FIG. 11 shows a block diagram 1100 of a device 1105 that supports simultaneous control information reception from source and target cells during handover in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to simultaneous control information reception from source and target cells during handover, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an UE capability manager 1120, a control resource manager 1125, and a control information manager 1130. The communications manager 1115 may be an example of aspects of the communications manager 1310 described herein.

The UE capability manager 1120 may receive a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station.

The control resource manager 1125 may select, based on the dual-base station control resource allocation scheme, a first set of control channel monitoring resources for the source base station and a second set of control channel monitoring resources for the target base station.

The control information manager 1130 may transmit, during the MBB handover procedure, source base station control information from the source base station during the first set of control channel monitoring resources while the target base station transmits target base station control information during the second set of control channel monitoring resources.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
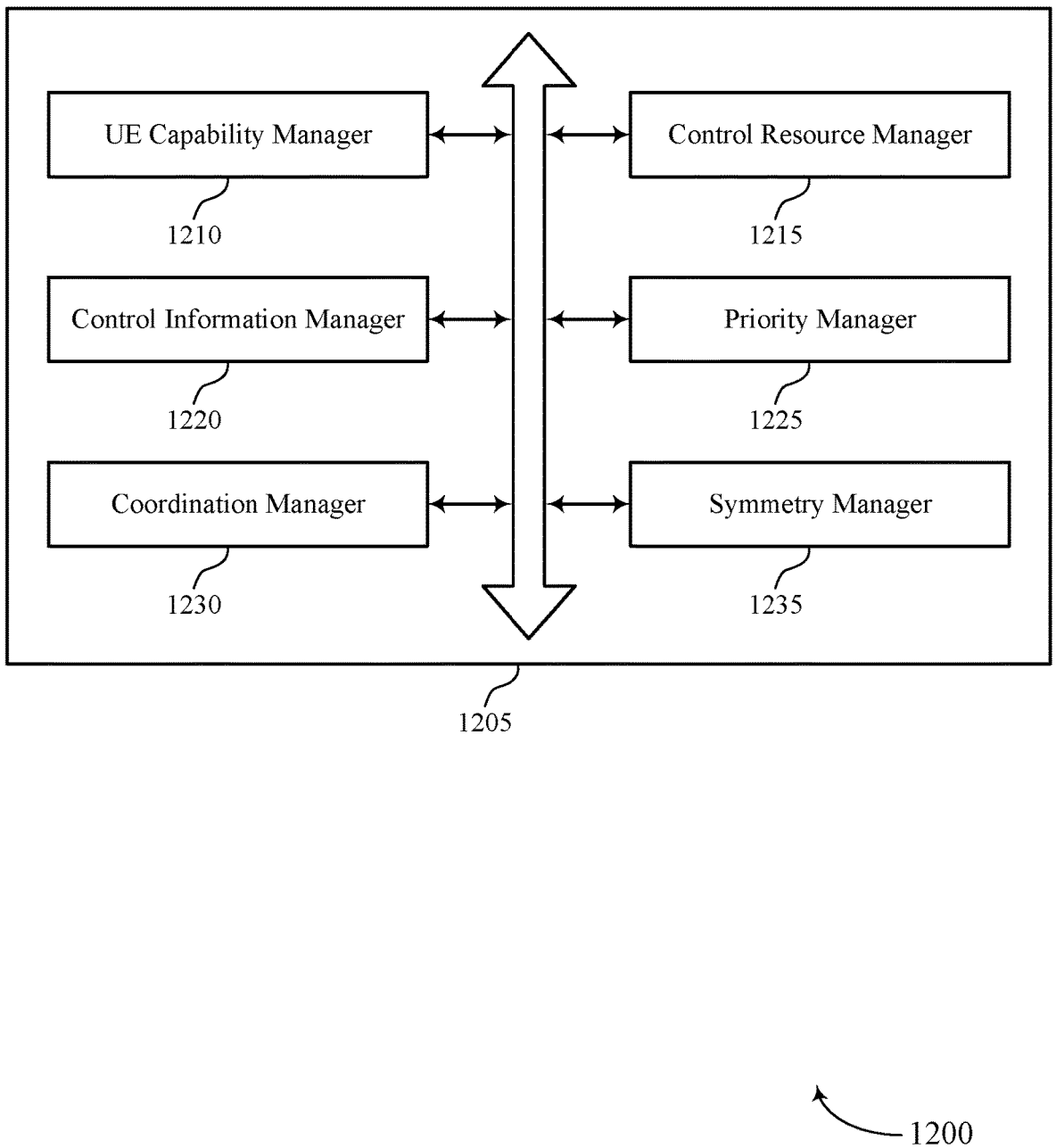
FIG. 12 shows a block diagram of a communications manager that supports simultaneous control information reception from source and target cells during handover in accordance with aspects of the present disclosure.

FIG. 12 shows a block diagram 1200 of a communications manager 1205 that supports simultaneous control information reception from source and target cells during handover in accordance with aspects of the present disclosure. The communications manager 1205 may be an example of aspects of a communications manager 1015, a communications manager 1115, or a communications manager 1310 described herein. The communications manager 1205 may include an UE capability manager 1210, a control resource manager 1215, a control information manager 1220, a priority manager 1225, a coordination manager 1230, and a symmetry manager 1235. Each of these modules may communicate, directly or indirectly, with one another (e.g., via one or more buses).

The UE capability manager 1210 may receive a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station. In some cases, the UE capability message includes a first indication of support for a source base station resource allocation scheme and a second indication of support for a target base station resource allocation scheme, where the dual-base station control resource allocation scheme is based on the first indication and the second indication. In some cases, the UE capability message includes a single indication of support for the dual-base station control resource allocation scheme.

The control resource manager 1215 may select, based on the dual-base station control resource allocation scheme, a first set of control channel monitoring resources for the source base station and a second set of control channel monitoring resources for the target base station. In some cases, the first set of control channel monitoring resources are in a same frequency range as the second set of control channel monitoring resources. In some cases, the first set of control channel monitoring resources are in a different frequency range as the second set of control channel monitoring resources. In some cases, the UE supported control channel monitoring resources include at least one of PDCCH candidates that the UE attempts blind decoding, a CCE candidate location of PDCCH that the UE performs channel estimation, or a combination thereof.

The control information manager 1220 may transmit, during the MBB handover procedure, source base station control information from the source base station during the first set of control channel monitoring resources while the target base station transmits target base station control information during the second set of control channel monitoring resources.

The priority manager 1225 may identify at least one of a base station priority of the source base station and the target base station, or a numerology of the source base station and the target base station, or a number of component carriers associated with the source base station and the target base station, or a combination, where the selecting is based on the identifying.

The coordination manager 1230 may provide, during the MBB handover procedure, an indication of the second set of control channel monitoring resources to the target base station. In some examples, the coordination manager 1230 may coordinate, during the MBB handover procedure, with the target base station to select the first set of control channel monitoring resources and the second set of control channel monitoring resources.

In some cases, the coordinating includes exchanging one or more messages via at least one of a backhaul network, or a core network function, or a CU function associated with the source base station and target base station, or a combination thereof.

The symmetry manager 1235 may determine, based on the UE capability message, that the UE supports at least one of a symmetric dual-base station control resource allocation scheme, or an asymmetric dual-base station control resource allocation scheme, or a combination thereof.

In some cases, the first set of control channel monitoring resources include a balanced number of control channel monitoring resources as the second set of control channel monitoring resources in the symmetric dual-base station control resource allocation scheme.

In some cases, the first set of control channel monitoring resources include an unbalanced number of control channel monitoring resources as the second set of control channel monitoring resources in the asymmetric dual-base station control resource allocation scheme.

Figure 13:
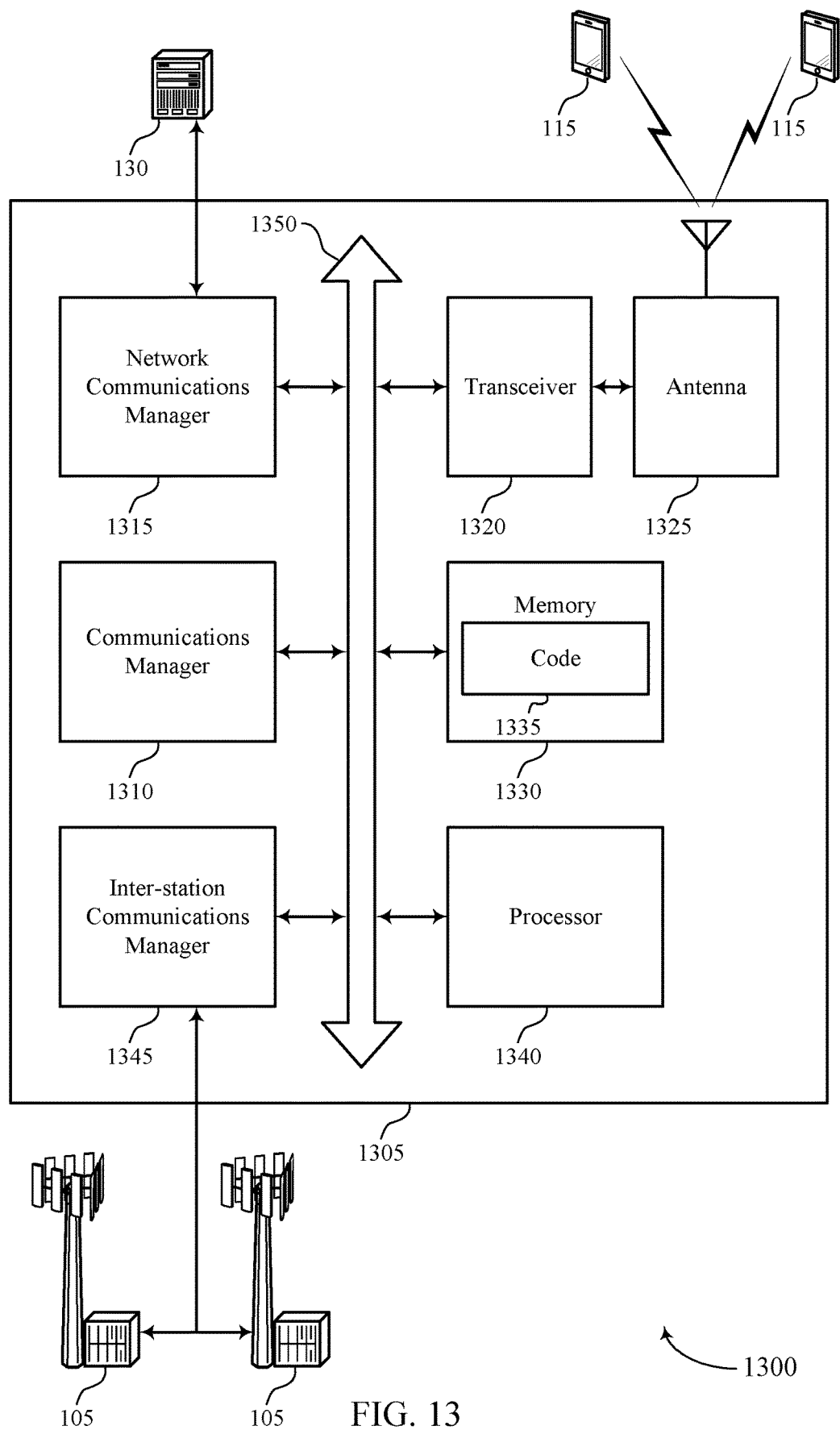
FIG. 13 shows a diagram of a system including a device that supports simultaneous control information reception from source and target cells during handover in accordance with aspects of the present disclosure.

FIG. 13 shows a diagram of a system 1300 including a device 1305 that supports simultaneous control information reception from source and target cells during handover in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may receive a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station, select, based on the dual-base station control resource allocation scheme, a first set of control channel monitoring resources for the source base station and a second set of control channel monitoring resources for the target base station, and transmit, during the MBB handover procedure, source base station control information from the source base station during the first set of control channel monitoring resources while the target base station transmits target base station control information during the second set of control channel monitoring resources.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting simultaneous control information reception from source and target cells during handover).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
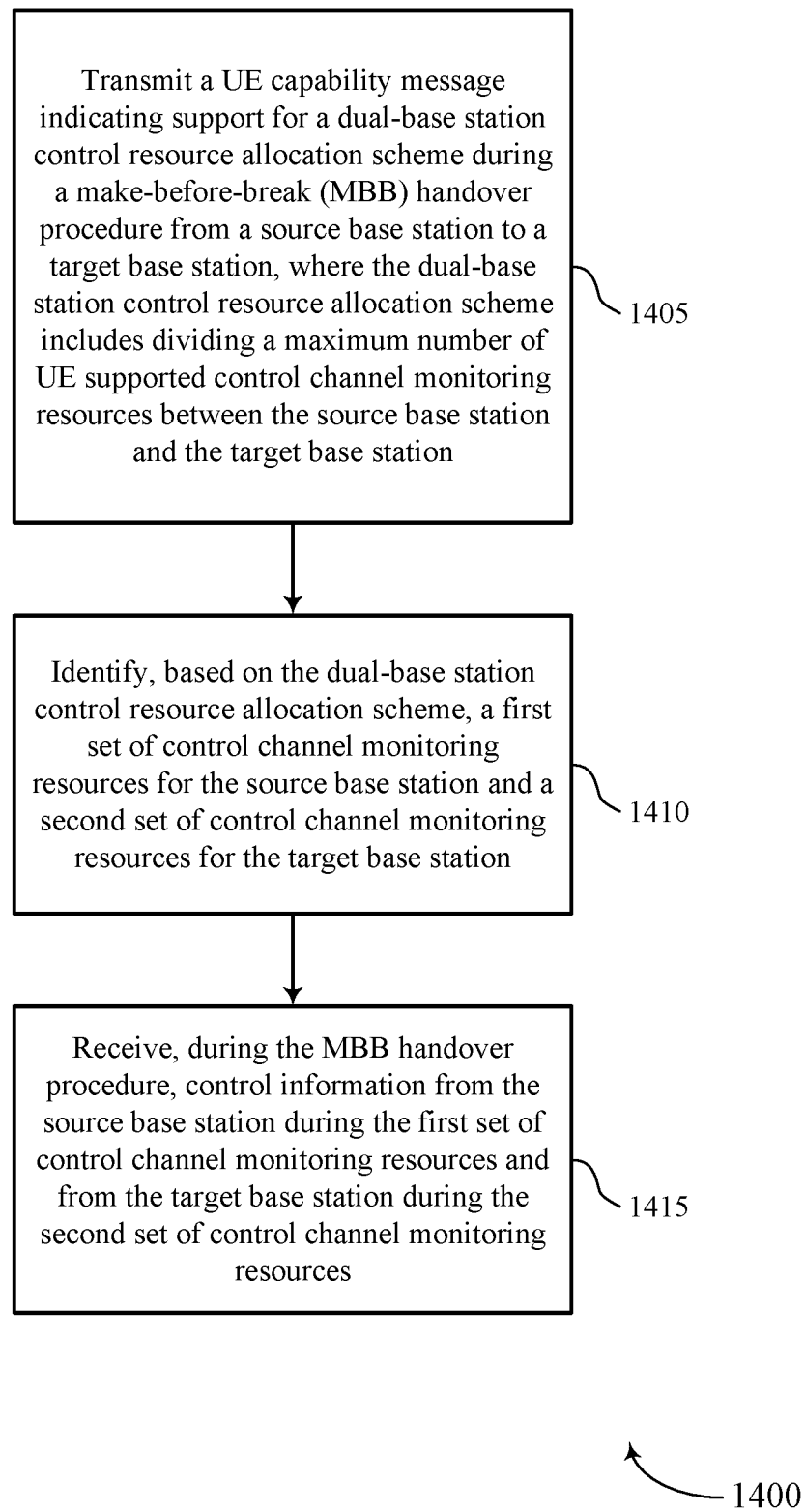
FIGS. 14 through 18 show flowcharts illustrating methods that support simultaneous control information reception from source and target cells during handover in accordance with aspects of the present disclosure.

FIG. 14 shows a flowchart illustrating a method 1400 that supports simultaneous control information reception from source and target cells during handover in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may transmit a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station. The operations of 1405 may be performed according to the methods described herein. In some examples, aspects of the operations of 1405 may be performed by an UE capability manager as described with reference to FIGS. 6 through 9.

At 1410, the UE may identify, based on the dual-base station control resource allocation scheme, a first set of control channel monitoring resources for the source base station and a second set of control channel monitoring resources for the target base station. The operations of 1410 may be performed according to the methods described herein. In some examples, aspects of the operations of 1410 may be performed by a control resource manager as described with reference to FIGS. 6 through 9.

At 1415, the UE may receive, during the MBB handover procedure, control information from the source base station during the first set of control channel monitoring resources and from the target base station during the second set of control channel monitoring resources. The operations of 1415 may be performed according to the methods described herein. In some examples, aspects of the operations of 1415 may be performed by a control information manager as described with reference to FIGS. 6 through 9.

Figure 15:
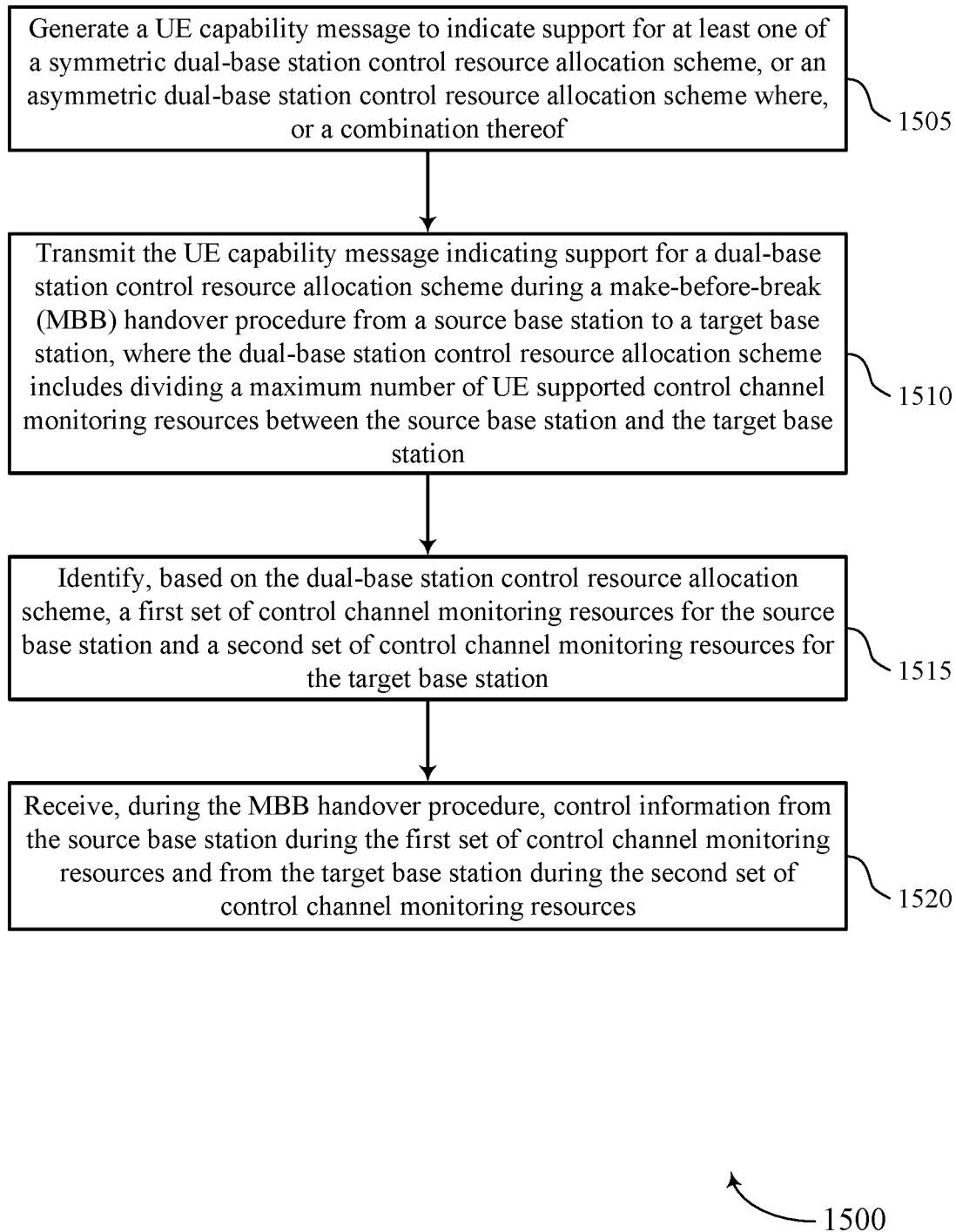

FIG. 15 shows a flowchart illustrating a method 1500 that supports simultaneous control information reception from source and target cells during handover in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may generate the UE capability message to indicate support for at least one of a symmetric dual-base station control resource allocation scheme, or an asymmetric dual-base station control resource allocation scheme, or a combination thereof. The operations of 1505 may be performed according to the methods described herein. In some examples, aspects of the operations of 1505 may be performed by a symmetry manager as described with reference to FIGS. 6 through 9.

At 1510, the UE may transmit a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station. The operations of 1510 may be performed according to the methods described herein. In some examples, aspects of the operations of 1510 may be performed by an UE capability manager as described with reference to FIGS. 6 through 9.

At 1515, the UE may identify, based on the dual-base station control resource allocation scheme, a first set of control channel monitoring resources for the source base station and a second set of control channel monitoring resources for the target base station. The operations of 1515 may be performed according to the methods described herein. In some examples, aspects of the operations of 1515 may be performed by a control resource manager as described with reference to FIGS. 6 through 9.

At 1520, the UE may receive, during the MBB handover procedure, control information from the source base station during the first set of control channel monitoring resources and from the target base station during the second set of control channel monitoring resources. The operations of 1520 may be performed according to the methods described herein. In some examples, aspects of the operations of 1520 may be performed by a control information manager as described with reference to FIGS. 6 through 9.

Figure 16:
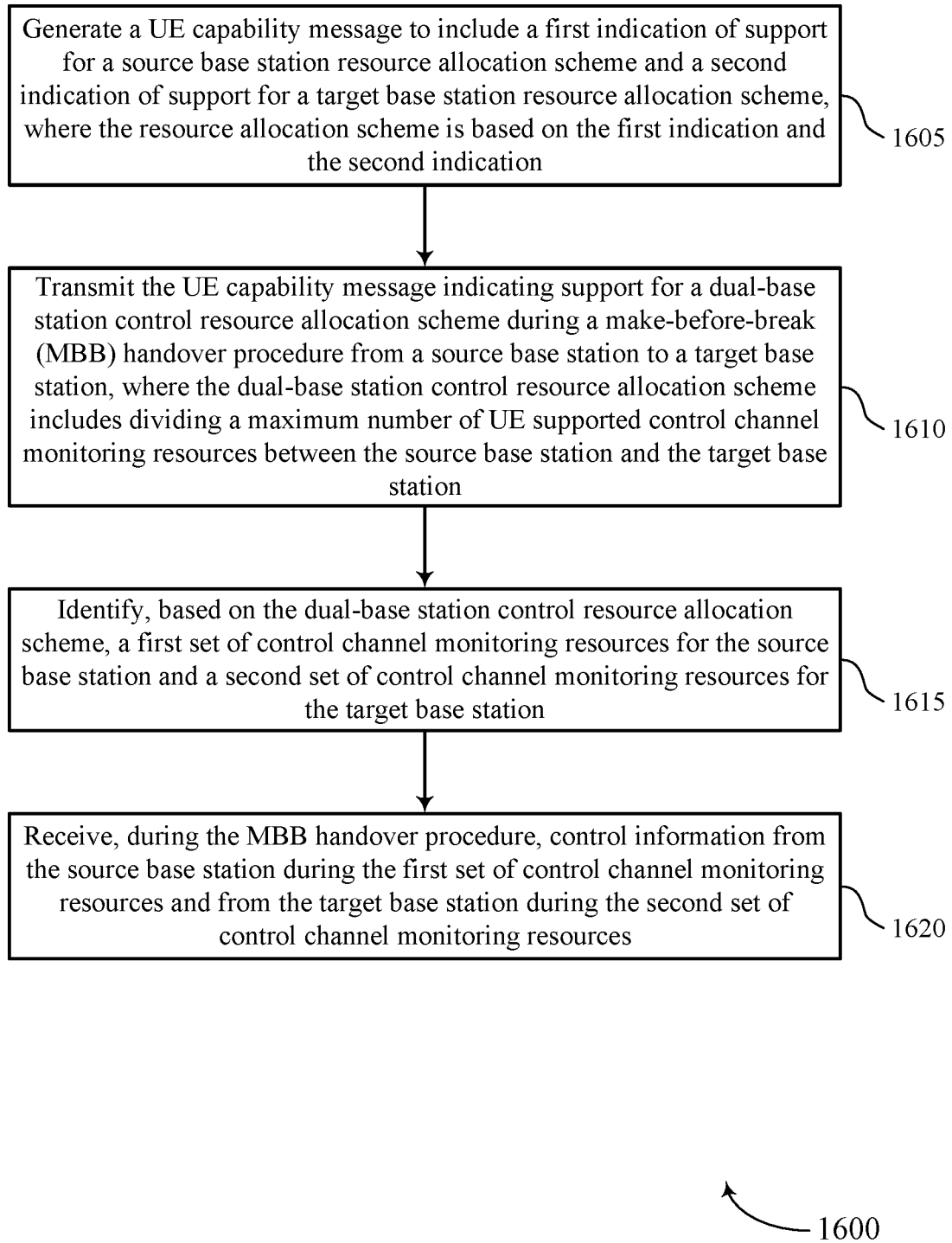

FIG. 16 shows a flowchart illustrating a method 1600 that supports simultaneous control information reception from source and target cells during handover in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may generate the UE capability message to include a first indication of support for a source base station resource allocation scheme and a second indication of support for a target base station resource allocation scheme, where the dual-base station control resource allocation scheme is based on the first indication and the second indication. The operations of 1605 may be performed according to the methods described herein. In some examples, aspects of the operations of 1605 may be performed by an UE capability indication manager as described with reference to FIGS. 6 through 9.

At 1610, the UE may transmit a UE capability message indicating support for a dual-base station control resource allocation scheme during an MBB handover procedure from a source base station to a target base station, where the dual-base station control resource allocation scheme includes dividing a maximum number of UE supported control channel monitoring resources between the source base station and the target base station. The operations of 1610 may be performed according to the methods described herein. In some examples, aspects of the operations of 1610 may be performed by an UE capability manager as described with reference to FIGS. 6 through 9.

At 1615, the UE may identify, based on the dual-base station control resource allocation scheme, a first set of control channel monitoring resources for the source base station and a second set of control channel monitoring resources for the target base station. The operations of 1615 may be performed according to the methods described herein. In some examples, aspects of the operations of 1615 may be performed by a control resource manager as described with reference to FIGS. 6 through 9.

At 1620, the UE may receive, during the MBB handover procedure, control information from the source base station during the first set of control channel monitoring resources and from the target base station during the second set of control channel monitoring resources. The operations of 1620 may be performed according to the methods described herein. In some examples, aspects of the operations of 1620 may be performed by a control information manager as described with reference to FIGS. 6 through 9.

Figure 17:
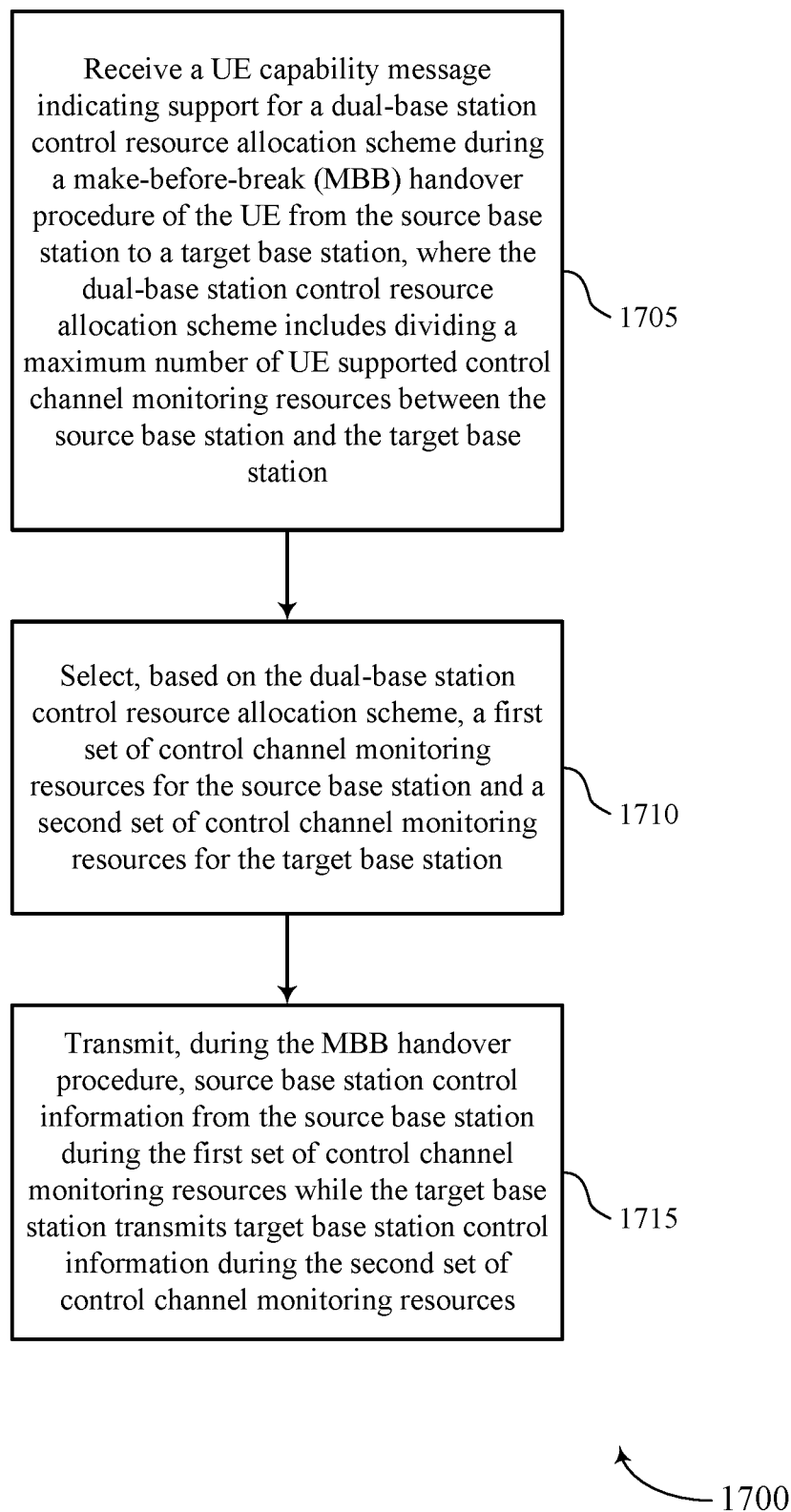

FIG. 17 shows a flowchart illustrating a method 1700 that supports simultaneous control information reception from source and target cells during handover in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may receive a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station. The operations of 1705 may be performed according to the methods described herein. In some examples, aspects of the operations of 1705 may be performed by an UE capability manager as described with reference to FIGS. 10 through 13.

At 1710, the base station may select, based on the dual-base station control resource allocation scheme, a first set of control channel monitoring resources for the source base station and a second set of control channel monitoring resources for the target base station. The operations of 1710 may be performed according to the methods described herein. In some examples, aspects of the operations of 1710 may be performed by a control resource manager as described with reference to FIGS. 10 through 13.

At 1715, the base station may transmit, during the MBB handover procedure, source base station control information from the source base station during the first set of control channel monitoring resources while the target base station transmits target base station control information during the second set of control channel monitoring resources. The operations of 1715 may be performed according to the methods described herein. In some examples, aspects of the operations of 1715 may be performed by a control information manager as described with reference to FIGS. 10 through 13.

Figure 18:
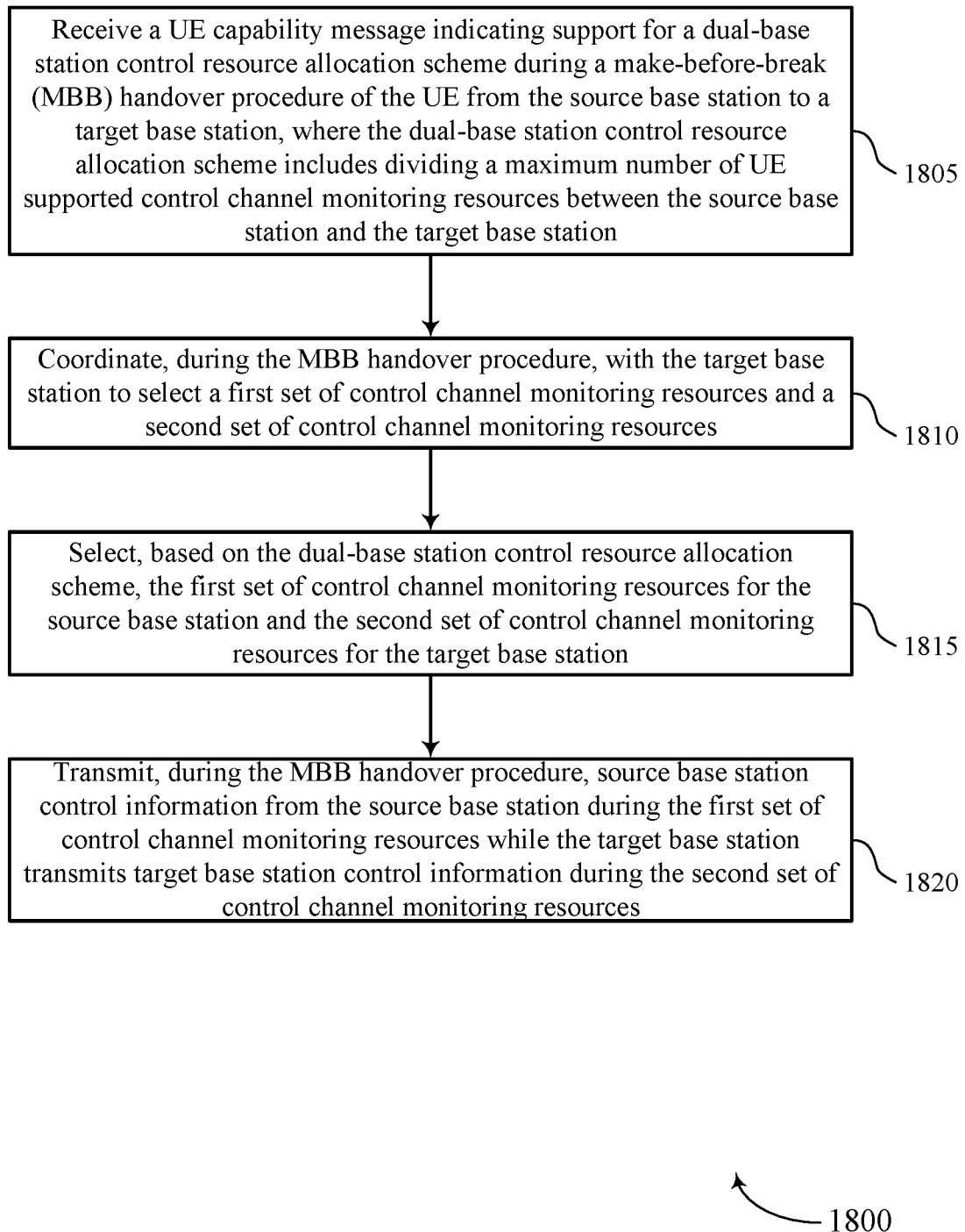

FIG. 18 shows a flowchart illustrating a method 1800 that supports simultaneous control information reception from source and target cells during handover in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may receive a UE capability message indicating support for a dual-base station control resource allocation scheme during an MBB handover procedure of the UE from the source base station to a target base station, where the dual-base station control resource allocation scheme includes dividing a maximum number of UE supported control channel monitoring resources between the source base station and the target base station. The operations of 1805 may be performed according to the methods described herein. In some examples, aspects of the operations of 1805 may be performed by an UE capability manager as described with reference to FIGS. 10 through 13.

At 1810, the base station may coordinate, during the MBB handover procedure, with the target base station to select the first set of control channel monitoring resources and the second set of control channel monitoring resources. The operations of 1810 may be performed according to the methods described herein. In some examples, aspects of the operations of 1810 may be performed by a coordination manager as described with reference to FIGS. 10 through 13.

At 1815, the base station may select, based on the dual-base station control resource allocation scheme, a first set of control channel monitoring resources for the source base station and a second set of control channel monitoring resources for the target base station. The operations of 1815 may be performed according to the methods described herein. In some examples, aspects of the operations of 1815 may be performed by a control resource manager as described with reference to FIGS. 10 through 13.

At 1820, the base station may transmit, during the MBB handover procedure, source base station control information from the source base station during the first set of control channel monitoring resources while the target base station transmits target base station control information during the second set of control channel monitoring resources. The operations of 1820 may be performed according to the methods described herein. In some examples, aspects of the operations of 1820 may be performed by a control information manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA.

A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    transmitting a UE capability message indicating support for a dual-base station control resource allocation scheme during a make-before-break (MBB) handover procedure from a source base station to a target base station, wherein the dual-base station control resource allocation scheme comprises dividing a maximum number of UE supported control channel monitoring resources between the source base station and the target base station;
    identifying, based at least in part on the dual-base station control resource allocation scheme, a first set of control channel monitoring resources for the source base station and a second set of control channel monitoring resources for the target base station; and
    receiving, during the MBB handover procedure, control information from the source base station during the first set of control channel monitoring resources and from the target base station during the second set of control channel monitoring resources.

2. The method of claim 1, further comprising:
    generating the UE capability message to indicate support for at least one of a symmetric dual-base station control resource allocation scheme, or an asymmetric dual-base station control resource allocation scheme, or a combination thereof.

3. The method of claim 2, wherein:
    the first set of control channel monitoring resources comprise a balanced number of control channel monitoring resources as the second set of control channel monitoring resources in the symmetric dual-base station control resource allocation scheme; and
    the first set of control channel monitoring resources comprise an unbalanced number of control channel monitoring resources as the second set of control channel monitoring resources in the asymmetric dual-base station control resource allocation scheme.

4. The method of claim 1, further comprising:
    generating the UE capability message to include a first indication of support for a source base station resource allocation scheme and a second indication of support for a target base station resource allocation scheme, wherein the dual-base station control resource allocation scheme is based at least in part on the first indication and the second indication.

5. The method of claim 1, further comprising:
    generating the UE capability message to include a single indication of support for the dual-base station control resource allocation scheme.

6. The method of claim 1, wherein the first set of control channel monitoring resources are in a same frequency range as the second set of control channel monitoring resources.

7. The method of claim 6, further comprising:
    receiving the control information from the source base station during the first set of control channel monitoring resources using a first beamform configuration; and
    receiving the control information from the target base station during the second set of control channel monitoring resources using a second beamform configuration that is different from the first beamform configuration.

8. The method of claim 1, wherein the first set of control channel monitoring resources are in a different frequency range as the second set of control channel monitoring resources.

9. The method of claim 8, further comprising:
    receiving the control information from the source base station during the first set of control channel monitoring resources over a first frequency range; and
    receiving the control information from the target base station during the second set of control channel monitoring resources over a second frequency range that is different from the first frequency range.

10. The method of claim 1, wherein the UE supported control channel monitoring resources comprise at least one of: physical downlink control channel (PDCCH) candidates that the UE attempts blind decoding, a control channel element (CCE) candidate location of PDCCH that the UE performs channel estimation, or a combination thereof.

11. A method for wireless communication at a source base station, comprising:
    receiving a user equipment (UE) capability message indicating support for a dual-base station control resource allocation scheme during a make-before-break (MBB) handover procedure of the UE from the source base station to a target base station, wherein the dual-base station control resource allocation scheme comprises dividing a maximum number of UE supported control channel monitoring resources between the source base station and the target base station;
    selecting, based at least in part on the dual-base station control resource allocation scheme, a first set of control channel monitoring resources for the source base station and a second set of control channel monitoring resources for the target base station; and
    transmitting, during the MBB handover procedure, source base station control information from the source base station during the first set of control channel monitoring resources while the target base station transmits target base station control information during the second set of control channel monitoring resources.

12. The method of claim 11, further comprising:
identifying at least one of a base station priority of the source base station and the target base station, or a numerology of the source base station and the target base station, or a number of component carriers associated with the source base station and the target base station, or a combination, wherein the selecting is based at least in part on the identifying.

13. The method of claim 11, further comprising:
providing, during the MBB handover procedure, an indication of the second set of control channel monitoring resources to the target base station.

14. The method of claim 11, further comprising:
coordinating, during the MBB handover procedure, with the target base station to select the first set of control channel monitoring resources and the second set of control channel monitoring resources.

15. The method of claim 14, wherein the coordinating comprises exchanging one or more messages via at least one of a backhaul network, or a core network function, or a central unit (CU) function associated with the source base station and target base station, or a combination thereof.

16. The method of claim 11, further comprising:
determining, based at least in part on the UE capability message, that the UE supports at least one of a symmetric dual-base station control resource allocation scheme, or an asymmetric dual-base station control resource allocation scheme, or a combination thereof.

17. The method of claim 16, wherein:
the first set of control channel monitoring resources comprise a balanced number of control channel monitoring resources as the second set of control channel monitoring resources in the symmetric dual-base station control resource allocation scheme; and
the first set of control channel monitoring resources comprise an unbalanced number of control channel monitoring resources as the second set of control channel monitoring resources in the asymmetric dual-base station control resource allocation scheme.

18. The method of claim 11, wherein the UE capability message includes a first indication of support for a source base station resource allocation scheme and a second indication of support for a target base station resource allocation scheme, wherein the dual-base station control resource allocation scheme is based at least in part on the first indication and the second indication.

19. The method of claim 11, wherein the UE capability message includes a single indication of support for the dual-base station control resource allocation scheme.

20. The method of claim 11, wherein the first set of control channel monitoring resources are in a same frequency range as the second set of control channel monitoring resources.

21. The method of claim 11, wherein the first set of control channel monitoring resources are in a different frequency range as the second set of control channel monitoring resources.

22. The method of claim 11, wherein the UE supported control channel monitoring resources comprise at least one of: physical downlink control channel (PDCCH) candidates that the UE attempts blind decoding, a control channel element (CCE) candidate location of PDCCH that the UE performs channel estimation, or a combination thereof.

23. An apparatus for wireless communication at a user equipment (UE), comprising:
a processor,
memory coupled with the processor; and
instructions stored in the memory and executable by the processor to cause the apparatus to:
transmit a UE capability message indicating support for a dual-base station control resource allocation scheme during a make-before-break (MBB) handover procedure from a source base station to a target base station, wherein the dual-base station control resource allocation scheme comprises dividing a maximum number of UE supported control channel monitoring resources between the source base station and the target base station;
identify, based at least in part on the dual-base station control resource allocation scheme, a first set of control channel monitoring resources for the source base station and a second set of control channel monitoring resources for the target base station; and
receive, during the MBB handover procedure, control information from the source base station during the first set of control channel monitoring resources and from the target base station during the second set of control channel monitoring resources.

24. The apparatus of claim 23, wherein the instructions are further executable by the processor to cause the apparatus to:
generate the UE capability message to indicate support for at least one of a symmetric dual-base station control resource allocation scheme, or an asymmetric dual-base station control resource allocation scheme, or a combination thereof.

25. The apparatus of claim 24, wherein:
the first set of control channel monitoring resources comprise a balanced number of control channel monitoring resources as the second set of control channel monitoring resources in the symmetric dual-base station control resource allocation scheme; and
the first set of control channel monitoring resources comprise an unbalanced number of control channel monitoring resources as the second set of control channel monitoring resources in the asymmetric dual-base station control resource allocation scheme.

26. The apparatus of claim 23, wherein the instructions are further executable by the processor to cause the apparatus to:
generate the UE capability message to include a first indication of support for a source base station resource allocation scheme and a second indication of support for a target base station resource allocation scheme, wherein the dual-base station control resource allocation scheme is based at least in part on the first indication and the second indication.

27. The apparatus of claim 23, wherein the instructions are further executable by the processor to cause the apparatus to:
generate the UE capability message to include a single indication of support for the dual-base station control resource allocation scheme.

28. The apparatus of claim 23, wherein the first set of control channel monitoring resources are in a same frequency range as the second set of control channel monitoring resources.

29. The apparatus of claim 28, wherein the instructions are further executable by the processor to cause the apparatus to:
receive the control information from the source base station during the first set of control channel monitoring resources using a first beamform configuration; and receive the control information from the target base station during the second set of control channel monitoring resources using a second beamform configuration that is different from the first beamform configuration.

30. An apparatus for wireless communication at a source base station, comprising:
a processor,
memory coupled with the processor; and
instructions stored in the memory and executable by the processor to cause the apparatus to:
receive a user equipment (UE) capability message indicating support for a dual-base station control resource allocation scheme during a make-before-break (MBB) handover procedure of the UE from the source base station to a target base station, wherein the dual-base station control resource allocation scheme comprises dividing a maximum number of UE supported control channel monitoring resources between the source base station and the target base station;
select, based at least in part on the dual-base station control resource allocation scheme, a first set of control channel monitoring resources for the source base station and a second set of control channel monitoring resources for the target base station; and
transmit, during the MBB handover procedure, source base station control information from the source base station during the first set of control channel monitoring resources while the target base station transmits target base station control information during the second set of control channel monitoring resources.

* * * * *